(12) United States Patent
Martinez Corria et al.

(10) Patent No.: US 9,535,905 B2
(45) Date of Patent: Jan. 3, 2017

(54) STATISTICAL PROCESS CONTROL AND ANALYTICS FOR TRANSLATION SUPPLY CHAIN OPERATIONAL MANAGEMENT

(71) Applicant: International Business Machines Corporation, Armonk, NY (US)

(72) Inventors: Alejandro Martinez Corria, Barcelona (ES); Francis X. Rojas, Austin, TX (US); Linda F. Traudt, Las Vegas, NV (US); Saroj K. Vohra, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/741,242

(22) Filed: Jun. 16, 2015

(65) Prior Publication Data
US 2016/0170974 A1    Jun. 16, 2016

(30) Foreign Application Priority Data
Dec. 12, 2014   (EP) .................................... 14382513

(51) Int. Cl.
*G06F 3/12*   (2006.01)
*G06K 15/02*  (2006.01)
(Continued)

(52) U.S. Cl.
CPC ......... *G06F 17/289* (2013.01); *G06F 17/2854* (2013.01)

(58) Field of Classification Search
CPC ............ G05F 1/00; G06F 17/28; G06F 17/24; G10L 21/00
(Continued)

(56) References Cited

U.S. PATENT DOCUMENTS 6,665,640 B1    12/2003   Bennett et al.
6,876,966 B1 *  4/2005    Deng ................... G06K 9/6256
                                                   704/233

(Continued)

OTHER PUBLICATIONS

Radchenko, "Pattern recognition by quasi-linguistic translation into artificial noise-resistant language"; 2nd International Joint Conference on Artificial Intelligence, British Computer Society; Sep. 1-3, 1971, pp. 402-410.

(Continued)

*Primary Examiner* — Akwasi M Sarpong
(74) *Attorney, Agent, or Firm* — Shumaker & Sieffert, P.A.

(57) ABSTRACT

A method for translation supply chain analytics includes receiving operational variables of a translation process from a translation supply chain. The method further includes determining a cognitive leverage and a productivity factor for post editing of matches of a plurality of match types generated by the translation supply chain based at least in part on the operational variables from the translation supply chain. The method further includes generating linguistic markers for the matches of the plurality of match types generated by the translation supply chain, based at least in part on the cognitive leverage and the productivity factor for the post editing of the matches of the plurality of match types. The method further includes performing statistical analysis of the linguistic markers for the matches of the plurality of match types. The method further includes generating one or more analytics outputs based on the statistical analysis of the linguistic markers.

19 Claims, 23 Drawing Sheets

(51) Int. Cl.
   *G06K 15/22* (2006.01)
   *H04N 1/40* (2006.01)
   *B41C 1/00* (2006.01)
   *G06F 17/28* (2006.01)

(58) Field of Classification Search
   USPC ............................... 704/5, 2, 9, 4, 233, 243
   See application file for complete search history.

(56) References Cited

U.S. PATENT DOCUMENTS

| | | | |
|---|---|---|---|
| 7,383,542 B2 | 6/2008 | Richardson et al. | |
| 7,443,704 B2 * | 10/2008 | Oh ..................... | H02M 7/53803 |
| | | | 324/107 |
| 8,380,486 B2 * | 2/2013 | Soricut ................ | G06F 17/289 |
| | | | 704/2 |
| 8,760,130 B2 * | 6/2014 | Yamaguchi ............ | H03K 17/60 |
| | | | 323/265 |
| 2005/0267738 A1 * | 12/2005 | Wilkinson ............ | G06F 17/275 |
| | | | 704/9 |
| 2008/0262829 A1 * | 10/2008 | Liu ..................... | G06F 17/2229 |
| | | | 704/4 |
| 2010/0057438 A1 * | 3/2010 | Zhanyi ................ | G06F 17/2827 |
| | | | 704/4 |
| 2010/0138214 A1 * | 6/2010 | Kim ..................... | G06F 17/2836 |
| | | | 704/7 |
| 2012/0265531 A1 | 10/2012 | Bennett | |
| 2015/0378990 A1 * | 12/2015 | Martinez Corria ... | G06F 17/289 |
| | | | 704/2 |

OTHER PUBLICATIONS

Temizoz, "Machine Translation and Postediting," European Society for Translation Studies, Research Committee, State-of-the-Art Research Reports, Mar. 2012, 19 pp.

"Persona-Based Noise Management"; An IP.com Prior Art Database Technical Disclosure; http://ip.com/IPCOM/000230871D; Sep. 16, 2013, 3 pp.

* cited by examiner

STATISTICAL PROCESS CONTROL AND ANALYTICS FOR TRANSLATION SUPPLY CHAIN OPERATIONAL MANAGEMENT

This application claims the benefit of EP Application No. 14382513.1, which was filed on Dec. 12, 2014. The entire contents of EP Application No. 14382513.1 are incorporated by reference herein.

TECHNICAL FIELD

This disclosure relates to translation systems, and more particularly, to machine translation assisted translation systems.

BACKGROUND

Machine translation, based on various techniques of natural language processing (NLP) and machine learning (ML), has become increasingly capable in applications of translating from one natural language to another. Yet, individual human languages each have idiosyncrasies and subtleties that are persistently difficult to convey efficiently in other natural languages even through the efforts of gifted human translators, let alone through the techniques of machine translation. For purposes of professional translation, machine translation is helpful but persistently not fully adequate. Thus, professional translation has typically become the domain of professional human translators using various machine translation tools to enhance their productivity. The human translators are thus able to oversee the results of the machine translation tools, modifying or overriding the results of machine translation as necessary, ensuring proper application of the complexities of one human language to another, more quickly and efficiently than an unaided human would be capable of.

SUMMARY

In general, examples of this disclosure are directed to computing systems, devices, and methods for statistical process analytics and control for operational management of a translation supply chain that includes a combination of computer memory and machine translation components and human translators. The translation supply chain may include multiple stages and types of machine translation and human translators, which may be spread among multiple vendors or enterprises and subject to a single translation supply chain operational management system. A translation supply chain operational management system may include or implement techniques of statistical process analytics and control that analyze results from translation memory, machine translation of exact matches, and machine translation of fuzzy matches, in terms of human cognitive leverage from machine productivity, and human post editing productivity factor. The analysis of translation memory, machine translation of exact matches, and machine translation of fuzzy matches relative to cognitive leverage and productivity factor may enable characterizing the efficiency landscape of the translation supply chain, identifying the most important sources of inefficiency and how to resolve them, conveying these analytics results in rich visualizations, and providing feedback to the machine translation software components to improve their capability. A translation supply chain operational management system may therefore improve the efficiency of a complex translation supply chain.

In one example, a method for translation supply chain analytics includes receiving operational variables of a translation process from a translation supply chain. The method further includes determining a cognitive leverage and a productivity factor for post editing of matches of a plurality of match types generated by the translation supply chain based at least in part on the operational variables from the translation supply chain. The method further includes generating linguistic markers for the matches of the plurality of match types generated by the translation supply chain, based at least in part on the cognitive leverage and the productivity factor for the post editing of the matches of the plurality of match types. The method further includes performing statistical analysis of the linguistic markers for the matches of the plurality of match types. The method further includes generating one or more analytics outputs based on the statistical analysis of the linguistic markers.

In another example, a computer program product for translation supply chain analytics includes a computer-readable storage medium having program code embodied therewith. The program code is executable by a computing device to receive operational variables of a translation process from a translation supply chain. The program code is executable by a computing device to determine a cognitive leverage and a productivity factor for post editing of matches of a plurality of match types generated by the translation supply chain based at least in part on the operational variables from the translation supply chain. The program code is executable by a computing device to generate linguistic markers for the matches of the plurality of match types generated by the translation supply chain, based at least in part on the cognitive leverage and the productivity factor for the post editing of the matches of the plurality of match types. The program code is executable by a computing device to perform statistical analysis of the linguistic markers for the matches of the plurality of match types. The program code is executable by a computing device to generate one or more analytics outputs based on the statistical analysis of the linguistic markers.

In another example, a computer system for translation supply chain analytics includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to receive operational variables of a translation process from a translation supply chain. The computer system further includes program instructions, stored on at least one of the one or more storage devices for execution by at least one of the one or more processors via at least one of the one or more memories, to determine a cognitive leverage and a productivity factor for post editing of matches of a plurality of match types generated by the translation supply chain based at least in part on the operational variables from the translation supply chain. The computer system further includes program instructions, stored on at least one of the one or more storage devices for execution by at least one of the one or more processors via at least one of the one or more memories, to generate linguistic markers for the matches of the plurality of match types generated by the translation supply chain, based at least in part on the cognitive leverage and the productivity factor for the post editing of the matches of the plurality of match types. The computer system further includes program instructions, stored on at least one of the one or more storage devices for execution by at least one of the one or more processors via at least one of the one or more memories, to perform statistical analysis of the linguistic markers for the matches of the plurality of match types. The computer system further includes program instructions, stored on at least one of the one or more storage devices for execution by at least one of the one or more processors via at least one of the one or more memories, to generate one or more analytics outputs based on the statistical analysis of the linguistic markers.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 shows a conceptual block diagram of an example TSC with a TSC operational management system and TSC analytics tool, with additional detail on machine resources that the TM component, MT component, and PE component of the TSC may include and make use of.

DETAILED DESCRIPTION

Figure 1:
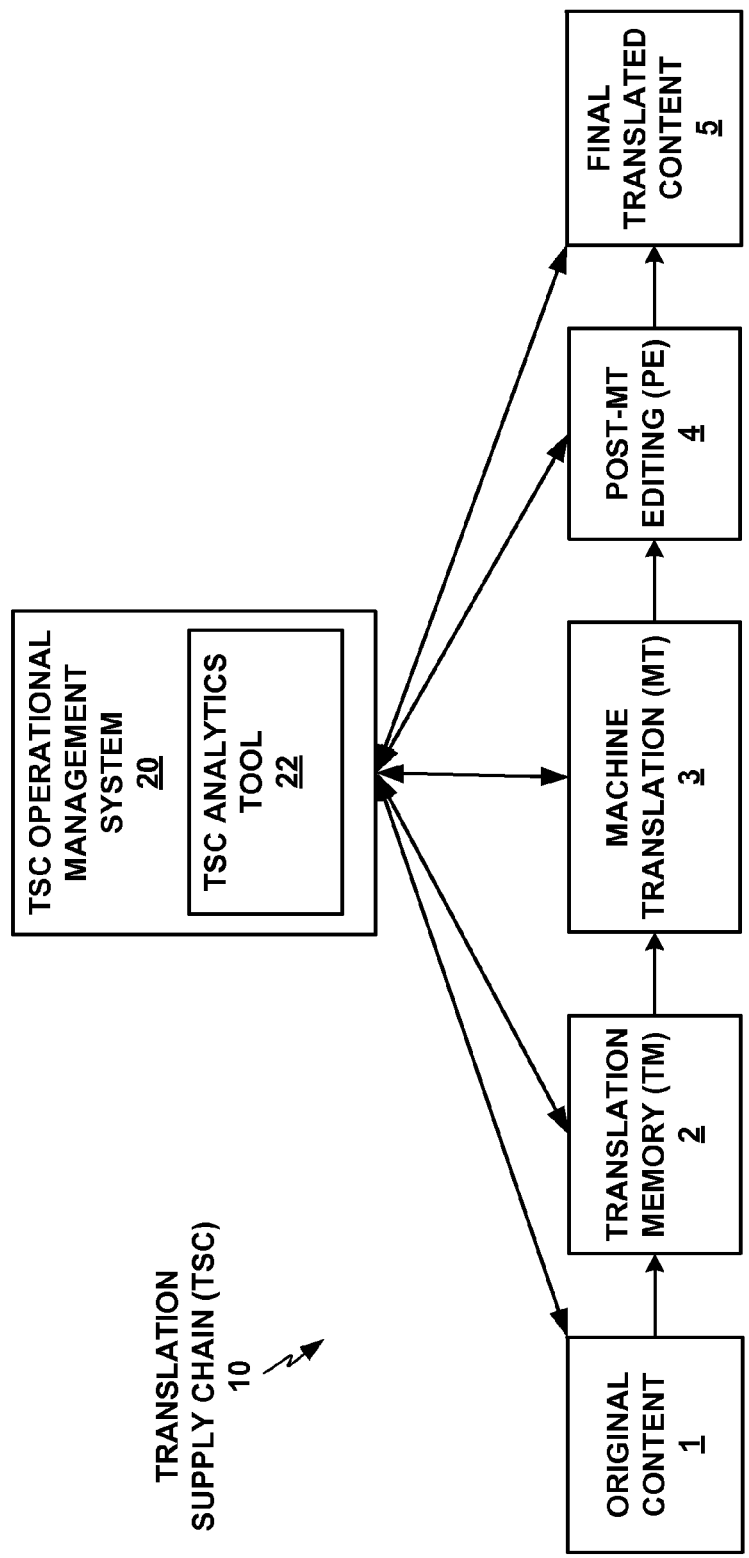
FIG. 1 shows a conceptual block diagram of an example translation supply chain (TSC) with a TSC operational management system that includes a translation supply chain statistical process analytics and control tool (or "TSC analytics tool").

FIG. 1 shows a conceptual block diagram of a translation supply chain (TSC) 10 with a TSC operational management system 20 that includes a translation supply chain statistical process analytics and control tool (or "TSC analytics tool") 22. As noted above, various examples disclosed herein are directed to computing systems, devices, and methods for statistical process analytics and control for operational management of TSC 10 that includes a combination of machine translation (MT) and human translators. TSC 10 may be used to perform high-quality translation (e.g., professional level; higher quality assurance than with unaided machine translation) of content such as documents from their original language into one or more target languages.

In particular, TSC 10 includes intake of original contents 1; machine application of translation memory (TM) component 2; new machine translation (MT) component 3; post editing (PE) component 4; and output of the final translated contents 5. Translation memory (TM) component 2 may include functions for both translation memory matching of exact matches (EM), and translation memory matching of fuzzy matches (FM). TM component 2 and MT component 3 may each include one or more systems, devices, methods, and services that may be spread across one or more service providers that may be internal or external to an enterprise that operates TSC 10 and TSC operational management system 20. PE component 4 may include one or more human translators or teams of human translators that may use any of a variety of machine tools, such as a computer-aided translation (CAT) editor, to assist in post editing and proofing of the results of TM component 2 and MT component 3, and may also be spread across one or more service providers that may be internal or external to an enterprise that operates TSC 10 and TSC operational management system 20. TSC 10 may thus include multiple stages and types of machine translation and human translators, which in some examples may be spread among multiple vendors or enterprises. Throughout this disclosure, TM component 2, MT component 3, and PE component 4 may be used to refer to respective collections of systems, devices, methods, and services included in or performed by one or more entities that fulfill these functions.

TSC 10 may be subject to a TSC chain operational management system 20 that includes TSC analytics tool 22. TSC analytics tool 22 may implement techniques of statistical process analytics and control to analyze the results of TM component 2, MT component 3 (including separate analysis of machine translation of exact matches and fuzzy matches), and PE component 4 over batches of translations (e.g., statistically significant batches of translation major keys, e.g., shipments), in terms of cognitive leverage "L," such as in terms of a percentage of acceptances of matches of one of the match types, including exact matches, fuzzy matches, and machine translation matches, due to the machine production (including TM component 2 and MT component 3) by PE component 4, and productivity factor "F," such as in terms of a weighted efficiency in words per minute of new translated content added to replace rejected matches by PE component 4, weighted by words per minute of the acceptances of the matches.

TSC analytics tool 22 may also perform analysis of linguistic markers and linguistic noise, and divide the analysis among various translation segments, such as small, medium, and complex segments, in some examples as further described below. TSC analytics tool 22 may also decompose linguistic noise between machine noise, asset noise, and contextual noise; measure the contribution of each type of linguistic noise to linguistic distortion; and analyze the translation memory, machine translation of exact matches, and machine translation of fuzzy matches in terms of linguistic distortion intersection points, in some examples as further described below.

The analysis of translation memory, machine translation of exact matches, and machine translation of fuzzy matches relative to cognitive leverage L and productivity factor F may enable TSC analytics tool 22 to characterize the efficiency landscape of a translation supply chain, identify the most important sources of inefficiency and how to resolve them, convey these analytics results in rich visualizations for a user, and provide feedback for the machine translation software components to improve their capability. A translation supply chain operational management system with TSC analytics tool 22 may therefore improve the efficiency of a complex translation supply chain.

In particular, TSC analytics tool 22 may reduce linguistic noise in the linguistic assets and the linguistic components used in TSC 10, as further described below. Linguistic noise is a measurable unit corresponding to the human labor expended (mechanical and/or cognitive effort) in PE component 4 to correct errors or shortcomings in translation matches by TM component 2 and/or MT component 3 such that the final translated content 5 is of a high quality level, such as human fluency quality level, in the target language. By reducing the linguistic noise across TSC 10, TSC analytics tool 22 may enable enhanced overall efficiency for TSC 10. TSC analytics tool 22 may implement techniques that include Statistical Process Control (SPC) methods, business analytics, process visualization, and pattern recognition directed to linguistic noise due to the linguistic components.

As particular examples, TSC analytics tool 22 may implement systems for measuring the linguistic noise across TSC 10; systems and methods for harvesting of linguistic quality control information across all the components of TSC 10; performing pattern recognition directed to linguistic noise on various types of collected linguistic quality control information; analyzing various operational variables that enable a set of predictive machine translation models; and visualizing components of TSC 10 that are running optimally and that are running inefficiently. TSC analytics tool 22 may also include (or be configured with access to) a central database or other type of data store as a repository for consolidating analytical data to view, track and report on elements involved with the efficiency of TSC 10 as managed by TSC analytics tool 22. TSC analytics tool 22 may also implement SPC methods for performing continuous real-time visualization and process control management.

TSC analytics tool 22 may define an analytics visualization system based on a base measurement of linguistic noise across TSC 10. TSC analytics tool 22 may analyze quality control information based on the following metrics: linguistic markers, linguistic vectors, linguistic noise, and supply chain noise. TSC analytics tool 22 may import, store, and manage quality control information from services performed across a plurality of languages, a plurality of shipments containing translated content (e.g., documents), or a plurality of segments of translation content or source content, or source segments, for which TSC analytics tool generates matches, or candidate translated segments. Languages, shipments, documents, and segments of translation content handled by TSC 10 may collectively be referred to throughout this disclosure as "major keys," or equivalently, "units of translation" of arbitrary size or demarcation. A "shipment" may refer to a translation work order or unit of translation content received by TSC 10 in a source language to be processed through TSC 10 for delivery or shipment of a translation of the content into one or more target languages to one or more recipients. A shipment may contain one or more documents, and TSC chain operational management system 20 may portion each document into a number of source segments prior to inputting the translation content to TM component 2. A "document" may in various examples refer to any computer system container or software object that contains one or more text segments. TM component 2 and MT component 3 may generate translation matches of various types for each of the segments prior to outputting the translation content to PE component 4, which may be used in machine aids for human post editors in the production of the final translated content 5.

TSC analytics tool 22 may recognize linguistic noise patterns and process modeling based on statistical analysis of the linguistic pattern variables over a plurality of events in a sample population of final translated content 5. TSC analytics tool 22 may create predictive MT models based on predictive analysis of operational variables in order to reduce the linguistic noise in MT matches, and thus enhance human professional linguist efficiency during post editing by PE component 4. TSC analytics tool 22 may implement analytics for creating and delivering analytics visualizations for managing and improving TSC 10.

As particular examples of analytics visualizations that may be implemented by TSC analytics tool 22, TSC analytics tool 22 may provide linguistic noise four-quadrant scatter plots, linguistic noise process behavior charts, and linguistic noise Pareto charts, each of which is briefly introduced as follows and described in more detail further below. The linguistic noise four-quadrant scatter plots may visualize the linguistic markers across a set of major keys, e.g., languages, shipments of finalized translated documents or other content, or segments, with a four-quadrant quality analysis system. The linguistic noise process behavior charts may visualize linguistic noise over a period of time with control limits defined and frequency of linguistic noise patterns over time. The linguistic noise process behavior charts may thus enable users on an operational management team for TSC operation management system 20 to see what parts of TSC 10 are performing well and what incidents or parts of TSC 10 show inferior performance and a potential need to be investigated. The linguistic noise Pareto charts may show a bar chart of shipments or other major keys in descending order of linguistic noise, cross-referenced by a line graph showing the volume of each corresponding shipment. The linguistic noise Pareto charts may thus enable users on an operational management team to see how improvements to certain elements of TSC 10 might impact the overall process behavior of TSC 10. TSC analytics tool 22 may provide these or other analytics visualizations to users on an operational management team for TSC operation management system 20 via a network user interface (UI) or other means, as described in more detail further below.

Generally, TSC operational management system 20 may seek to ensure a reliable and sustainable delivery of linguistic services based on three key performance indicators: cost, quality, and timeliness, in accordance with an agreed cost, quality assurance level, and time of delivery that may be specified in a service agreement. TSC operational management system 20 may focus on methods of enhancing the use of machine assets and enhancing the productivity of human post editing translators, such as enhancing the leverage or re-use of existing domain-specific linguistic assets (e.g., specific to legal, information technology (IT), medical, scientific, or other domains); identifying human post editing translators with domain-specific translation expertise; and managing unit costs of human post editing translators. TSC operational management system 20 may seek to perform operational analysis and control techniques such as balancing costs of services, efficiency, and quality added across TM component 2, MT component 3, and PE component 4, including the reinvestment of the results of PE component 4 into linguistic assets used in TM component 2 and MT component 3; and identifying and prioritizing the largest sources of inefficiency in terms of increased cost or decreased quality across the entire TSC 10, or the elements of TSC 10 with the highest cost-benefit opportunities for improvement.

The components of TSC 10 are further described as follows. Translation memory (TM) component 2 includes high quality, potentially domain-specific linguistic assets, such as sets of previous bilingual translations with certified quality assurance levels. The linguistic assets of translation memory 2 may include a data store of previously translated bilingual content, which may be divided into bilingual segments, which may also be used to train and tune one or more MT assets used for MT component 3. TM component 2 may also include one or more terminology data stores (e.g., language dictionaries, domain-specific glossaries or dictionaries) that may be either generalist or specific to a given domain (e.g., legal, IT, medical, scientific). TM component 2 may identify matches between input content and bilingual translations stored and indexed among its linguistic assets. TM component 2 may identify exact matches ("EM") where a portion of the input content is exactly the same as a portion of a stored bilingual translation. TM component 2 may also identify "fuzzy matches" ("FM") where a portion of the input content is close to the same as a portion of a stored bilingual translation, with the only differences falling within certain patterns or parameters (e.g., substitution of synonyms or near-synonyms) that may be encoded in algorithms of TM component 2 and that are simple enough not to require machine translation techniques. TM component 2 may be able to provide matches (exact or fuzzy) for portions of the content to be translated, and may output to MT component 3 the matches it has identified, identified as exact matches or fuzzy matches.

MT component 3 may receive inputs from TM component 2, perform one or more MT methods on the at least the inputs from TM component 2 that do not have exact matches, and deliver a machine translation of the complete content to be translated as output to PE component 4. In some examples, MT component 3 may perform independent translation of portions of content for which fuzzy matches were identified by TM component 2, or may integrate fuzzy matches depending on a selective quality check. MT component 3 may apply one or more domain-specific MT resources based on identification of a specific domain of the content to be translated by TSC operational management system 20. MT component 3 may include services that integrate (e.g., use for training, tuning, or corpora for machine learning) progressively more linguistic components such as from TM component 2 over time, such that an interdependency between quality linguistic assets in TM component 2 and custom domain services in MT component 3 grows to achieve high-quality machine translation of progressively more context and domain-specific knowledge over time.

PE component 4 includes services performed by human professional linguists to review, correct, and perform quality control on the translation produced by TM component 2 and MT component 3, so that the final plurality of translated content meets the expected quality service level. These services may use computer-aided translation editors or tools that integrate machine-human interface components or machine "assistants", thereby enhancing the efficiency of the human professional translators while promoting high quality of the final translated content 5.

TSC operational management system 20 and TSC analytics tool 22 are independent of any specific set of linguistic assets, resources, or technologies applied in TSC 10. TSC operational management system 20 and TSC analytics tool 22 may be applied to manage any set of linguistic assets, translation automation technologies, and human professional linguistic resources used within TSC 10. TSC operational management system 20 and TSC analytics tool 22 may instead merely pose selected requirements for quality control information, e.g., linguistic markers, to be provided by components of TSC 10.

Figure 2:
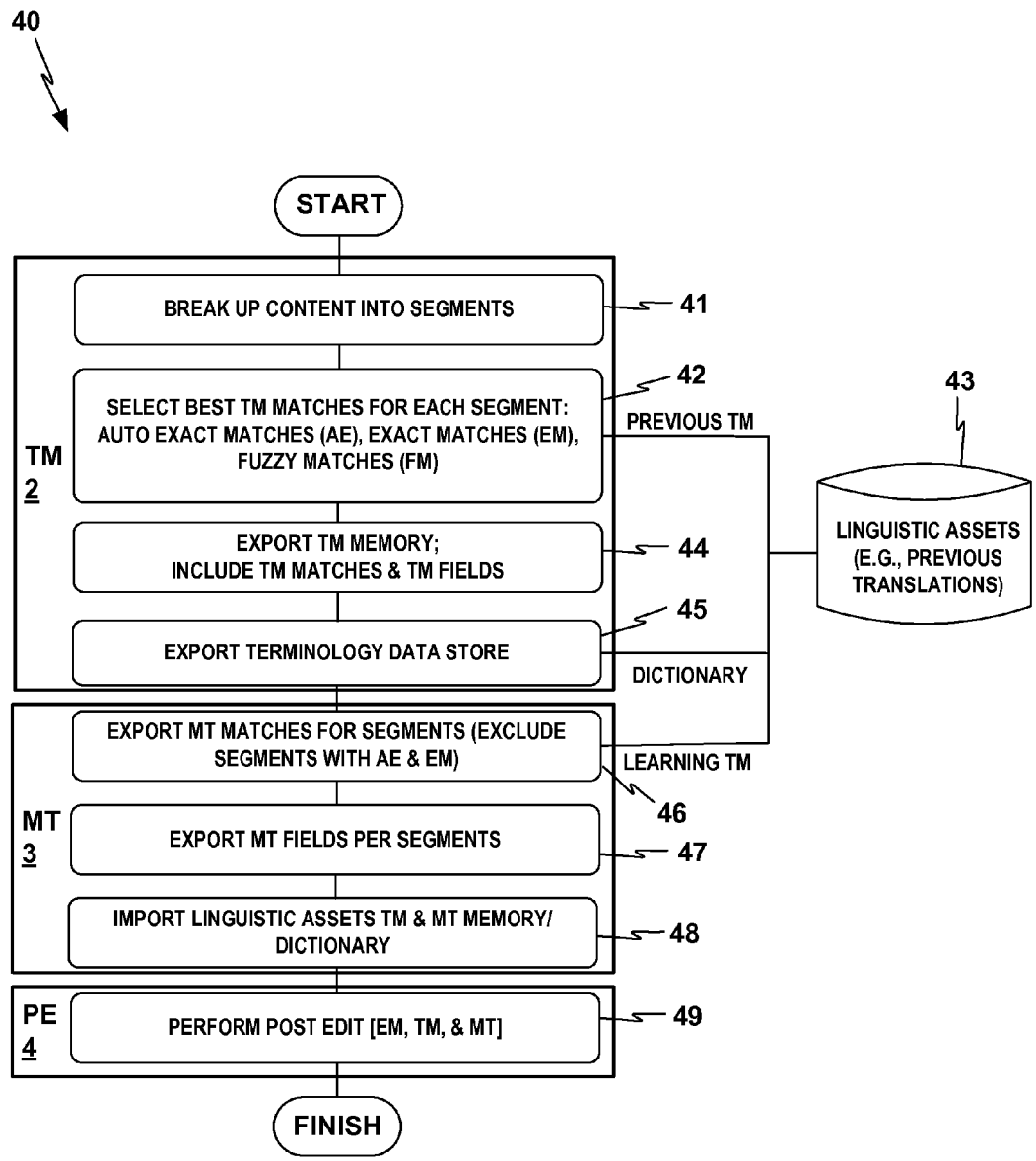
FIG. 2 shows a flowchart illustrating an example of a translation process for a TSC under the guidance of a TSC operational management system to process translation content through a TM component, an MT component, and a PE component.

FIG. 2 shows a flowchart illustrating an example process 40 for TSC 10 under the guidance of TSC operational management system 20 to process translation content through TM component 2, MT component 3, and PE component 4. TM component 2 may break down new source content into segments (or "translation units") via a task called segmentation within the TM services (41). For the plurality of source segments, TM component 2 may identify potential stored translation matches (or translated segments) for the source segments by searching one or more translation memory data stores for previously translated source segments. The plurality of previous translation segments are referred to as TM matches. TM component 2 may then analyze each of the segments with reference to a linguistic assets data store 43 and attempt to identify a match for each segment from the contents of linguistic assets data store 43. TM component 2 may illustratively classify TM matches into three classes: automatic exact matches (AE), exact matches (EM), and fuzzy matches (FM) (42). (In some examples, automatic exact matches may be grouped with exact matches.)

Auto exact matches (AE) refer to pre-existing translated segments whose source segment is an exact match of at least one new source segment, where both segments are found in the same document identifiers. AE matches may be automatically used to produce the new translations without any human labor. That is, AE matches may be exempted from further translation processing through TM component 2 and MT component 3, and instead presented to PE component 4 only for finalization before output of the final translated contents 5. AE matches may thus also be exempted from processing by TSC analytics tool 22, since they may be effectively already in finalized condition for output from TSC 10.

Exact matches (EM) refer to pre-existing translated segments whose source segment is an exact match of at least one new source segment, but the segments are found in different document identifiers or content identifiers. Since the context of the matching segments may be different between the different documents or other contents, TM component 2 may flag the EM translated segment as an EM for a human professional linguist in PE component 4 to review and either confirm lack of contextual variance in the target language or correct any contextual variances in the pre-existing translation generated by TM component 2.

Fuzzy match (FM) refers to pre-existing translated segments whose source segment is computed to be "similar" with at least one new source segment. For example, TM component 2 may determine that the string "the cat ran up the tree" is a fuzzy match of "the cat ran up the tree." Since these are not exact matches, TM component 2 may flag the FM translated segment as an FM for a human professional linguist in PE component 4 to expend likely more labor than on an EM in reviewing the fuzzy translation and revising or correcting if needed. Thus, the human labor in PE component 4 for exact matches is less than that for fuzzy matches. Percentage estimates of the breakdown of exact matches and fuzzy matches from TM component 2 on the human labor impact of translation in PE component 4 may be factored into payment agreements to external service providers involved in services for PE component 4.

TM component 2 may then export TM segments and TM information fields associated with specific segments to linguistic assets data store 43 (44). TM component 2 may define a mechanism for appending information fields to segments, where the information fields include "component markers" containing information from the TM analysis of the segments, so that such information can be used by downstream components in MT component 3 and/or PE component 4 for further analysis and improvement or optimization of the component. For example, TM component 2 may append ontology information to the segments that may be used by MT component 3 to improve MT models used by MT component 3. TM component 2 may also export terminology from a source content to the linguistic assets data store 43 (45).

MT component 3 may apply one or more machine translation techniques to the remainder of the translation content for which TM component 2 did not identify matches, and potentially including independent translation of content for which TM component 2 identified fuzzy matches. MT component 3 may also export the translation results of its MT techniques to linguistic assets data store 43 (46) for future use. MT component 3 may also generate MT information fields associated with specific segments that MT component 3 may include with its outputs to PE component 4, and may also export to linguistic assets data store 43 (47). For example, MT component 3 may append MT parameter settings to specific segments of the translation content to rank how well specific MT settings affect linguistic noise. MT component 3 may also import linguistic assets such as prior TM and MT results from linguistic assets data store 43 (48), which MT component 3 may use for further training or tuning of its MT techniques, for example. PE component 4 may receive the outputs of MT component 3 and perform post editing (49), as discussed above. PE component 4 may also communicate EM and FM matches from TM component 2 and MT matches from MT component 3 (though not AE matches in some examples, as indicated above) to TSC analytics tool 22 for various forms of analytics and other processes.

Figure 3:
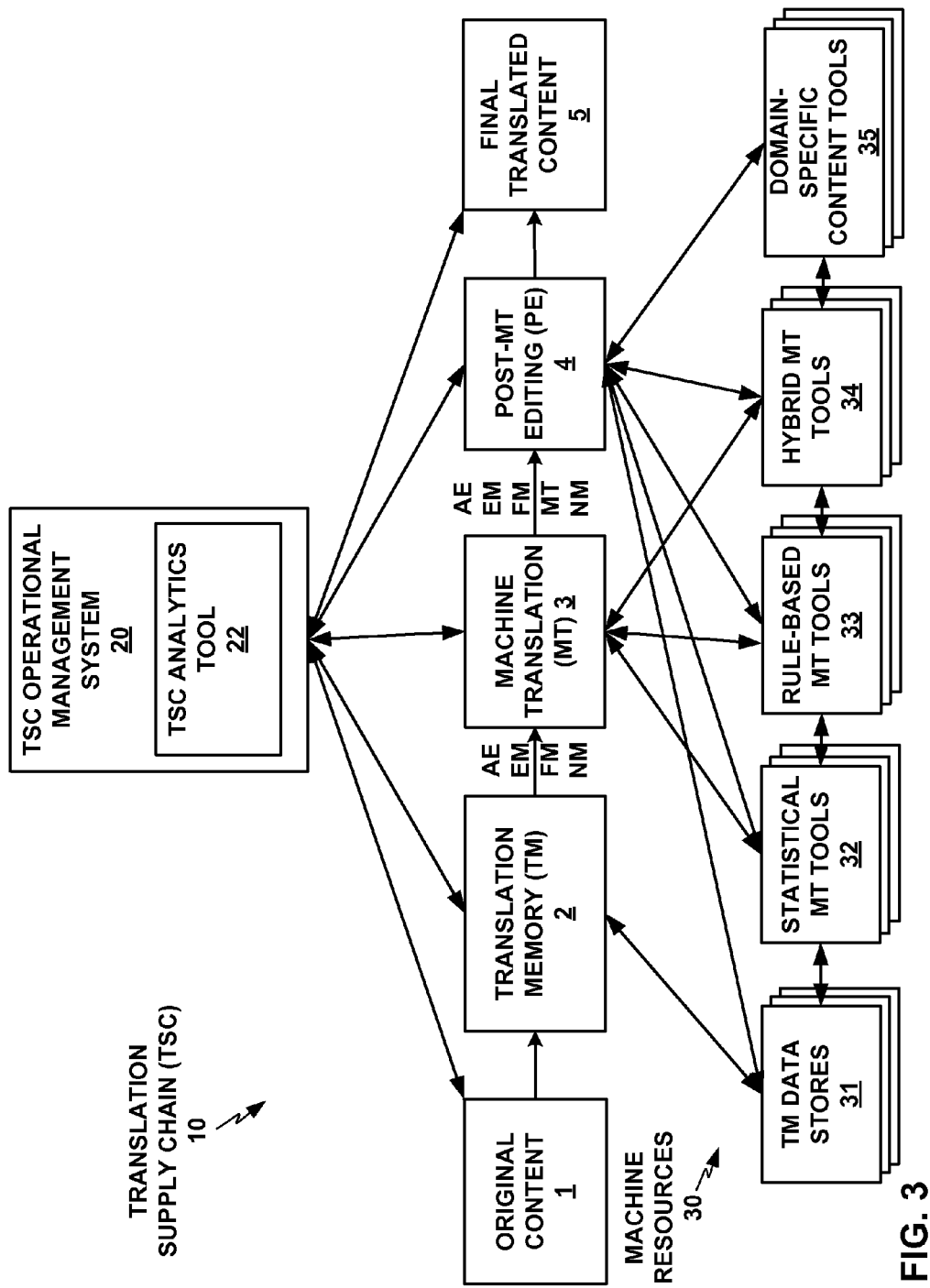

FIG. 3 shows a conceptual block diagram of TSC 10 with TSC operational management system 20 and TSC analytics tool 22, with additional detail on machine resources 30 that TM component 2, MT component 3, and PE component 4 of TSC 10 may include and make use of. Machine resources 30 may include computing systems, computing devices, data stores, and computer program products accessible by and executed by computing systems and devices, for example. As shown in FIG. 3, machine resources 30 may include translation memory data stores 31 (which may include or coincide with linguistic assets data store 43 of FIG. 2), one or more statistical machine translation (SMT) tools 32, one or more rule-based or expert system machine translation (RBMT) tools 33, one or more hybrid statistical/rule-based machine translation (HMT) tools 34, and one or more domain-specific content tools 35 (which may partially coincide with linguistic assets data store 43 of FIG. 2). TM component 2 may access TM data stores 31, as discussed above. TM component 2 may output partially translated content, including one or more of automatic exact matches (AE), non-automatic exact matches (EM), fuzzy matches (FM), and untranslated segments with no match (NM) to MT component 3, as shown in FIG. 3.

Information and data from TM data stores 31 may be accessed and used by the various machine translation assets SMT tools 32, RBMT tools 33, and HMT tools 34, and by domain-specific content tools 35. More broadly, all of machine resources 30 may access and share information and data with each other to enhance their respective capabilities as applicable.

MT component 3 may access one or more of SMT tools 32, RBMT tools 33, and HMT tools 34 to apply one or more of SMT tools 32, RBMT tools 33, and HMT tools 34 to perform machine translation on at least the untranslated segments with no match (NM) from TM component 2, and potentially also independent optional or replacement translations of segments of the translation content with fuzzy matches (FM) from TM component 2. Statistical MT tools 32 may apply methods of natural language processing or machine learning (ML), such as using training data and large corpora of translated content to train an MT system. Rule-based MT tools 33 may apply rule-based algorithms or expert systems that may encode specialized translation knowledge between two specific natural languages, such as morphological, syntactic, and other differences between the languages and how those differences affect translation. Rule-based MT tools 33 may also apply domain-specific specialized rules for areas such as specialized vocabularies, usages, format, style, etc. applicable in specific content domains, such as legal, IT, medical, or scientific, for example. Hybrid MT tools 34 may integrate statistical and rule-based MT techniques. MT component 3 may then communicate its output, including one or more of AE, EM, FM, and machine translated (MT) segments, and potentially still including untranslated segments with no match (NM) (if MT component 3 was unable to translate any content), to PE component 4.

In PE component 4, human translators may use their own specialized knowledge and skills, along with professional translation tools that may use, access, or benefit from any of TM data stores 31, SMT tools 32, RBMT tools 33, HMT tools 34, and domain-specific content tools 35. The work performed in PE component 4, such as translation confirmations, revisions, replacements, or selections among multiple options of fuzzy match results and/or machine translation results, may provide feedback to any of TM data stores 31, SMT tools 32, RBMT tools 33, HMT tools 34, and domain-specific content tools 35 to enhance them for future use. TSC operational management system 20 and TSC analytics tool 22 may also receive and analyze the actions and outputs of TM component 2, MT3, and PE component 4, and generate outputs, such as analytics visualizations, based thereon.

Table 1 below provides examples of variables per component of TSC 10 that could affect the overall efficiency of TSC 10, and that TSC analytics tool 22 may detect, measure, and analyze. These are offered as examples to understand that across TSC 10, there can potentially be a multitude of variables that need continuous monitoring and analysis.

TABLE 1

| Operational Area | Potential Noise Variables |
|---|---|
| Domain Content | quality of content |
| | complexity of subject area |
| | format of original content |
| | tags and in-line tags |
| | cultural changes across N languages within a single domain (medical, food, etc.) |
| Learning Assets (memory/rules) | quality of memory/rules used to train and tune MT services |
| MT Technology | MT settings |
| | language specific algorithms/rules |

TABLE 1-continued

| | |
|---|---|
| Natural Language | language pairs that have different morphological, semantic, syntactic, etc., structures, e.g., English-German have very different ways on how verbs are placed in sentences. |
| Human Post-Editing practices | human errors computer aided translation skills cultural/domain knowledge going too slow spending too much time evaluating bad MT matches |

In addition to the above variables, individual service providers within TSC 10 may apply various management systems that include tools for performing human assessment of quality metrics. Such quality management systems may be unique to each translation service provider and may include assessments on semantic, grammatical, ontology, style guide, and other variables. For the purposes of this disclosure, any such internal quality assessment tools of service providers within TSC 10 may be treated as just another component within TSC 10.

TSC analytics tool 22 may perform integrated measurement and analysis of linguistic noise across all the components of TSC 10, including TM component 2, MT component 3, and PE component 4, and all the machine resources 30 used by those components, and the relative performance of the various components on AE, EM, FM, MT, and NM outputs. TSC analytics tool 22 may individually measure and analyze each "translation event" performed by any component of TSC 10, where a "translation event" is any action performed to translate any segment or portion of the translation content by any component of TSC 10. TSC analytics tool 22 may analyze all of the translation events by each component of TSC 10 in terms of two "linguistic marker" components: cognitive leverage L, and productivity factor F, as indicated above, referring respectively to human cognitive leverage from the sum of machine productivity of TM component 2, MT component 3, and machine resources 30, and to human post editing productivity in PE component 4.

TSC analytics tool 22 may render cognitive leverage L and productivity factor F in an analytics visualization formatted as a two-dimensional graph with L and F defining a two dimensional coordinate system (L,F), with cognitive leverage L on the x axis and productivity factor F on the y axis. TSC analytics tool 22 may aggregate each linguistic marker across a plurality of editing events, e.g., post editing of individual segments via a Computer-Aided-Translation (CAT) system in PE component 4. TSC analytics tool 22 may define cognitive leverage L in terms of a measurement of machine resource leverage of human cognitive assessment of matches, such as by measuring what percentages of matches generated by TM component 2 and MT component 3 are accepted versus rejected during PE component 4, such that cognitive leverage is highest, e.g., 1.0 on a scale from 0 to 1.0, when all machine-generated matches from TM component 2 or MT component 3 are accepted in PE component 4.

TSC analytics tool 22 may define productivity factor F in terms of a weighted measurement of the productivity of PE component 4, such as by measuring productivity in seconds per word in finalizing translation content segments for which some type of match is provided by TM component 2 and/or MT component 3, weighted by productivity in seconds per word in finalizing content for which no match is provided.

For example, TSC analytics tool 22 may determine productivity factor F as a weighted value (e.g., percentage) that measures the time (and implicitly, the effort) needed to generate the final translation contents for a plurality of source segments with one or more matches, in PE component 4. A value of 1.0 would thus reflect the time (and implicitly, effort) needed to generate the final translation for a plurality of source segments with no matches. Thus, productivity factor F may also be thought of as productivity cost, such that higher productivity factor F represents higher cost and lower productivity, and lower productivity factor F represents higher productivity. The ideal may be for productivity factor F to be approaching or at zero, when human translators in PE component 4 require very few or no words to finalize content from machine-generated matches from TM component 2 or MT component 3, at least relative to words per second in finalizing content for which no match is provided, in cases in which finalizing content from machine-generated matches requires greater than zero words. In other words, TSC analytics tool 22 may determine productivity factor F as match productivity (e.g., in seconds per words) divided by or relative to no-match productivity (in the same scale, e.g., seconds per word). In this case, if the match productivity is 0 (zero seconds per word), then the productivity factor is 0; and if the match productivity is equal to the no-match productivity (seconds per word is identical whether matches are provided or not), then the productivity factor is 1. Productivity factor F may therefore be based at least in part on a weighted measurement of time per word to translate source segments with one or more match.

Figure 4:
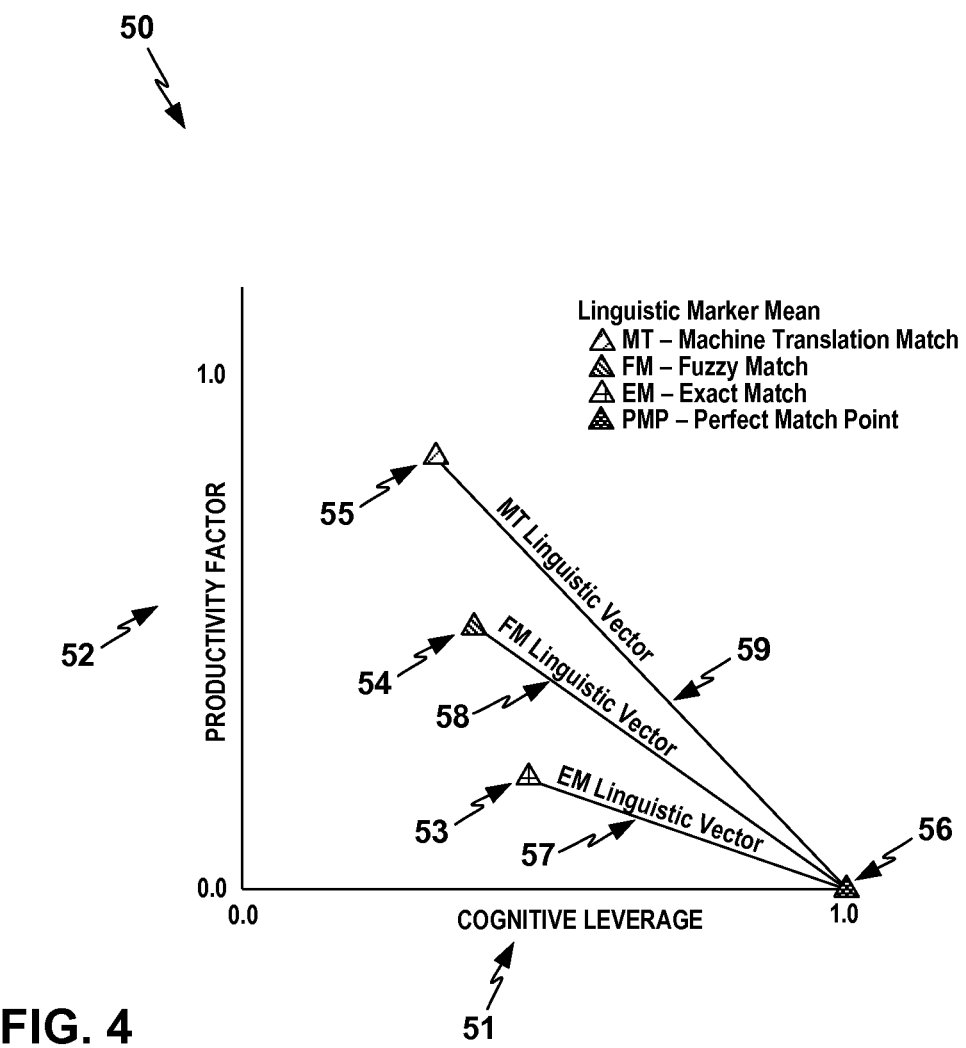
FIG. 4 shows an example linguistic marker analytics visualization graph with cognitive leverage L on the x axis and productivity factor F on the y axis that the TSC analytics tool may generate based on an analysis of the results of the TSC on a batch of translation content.

FIG. 4 shows an example linguistic marker analytics visualization graph 50 with cognitive leverage L on the x axis 51 and productivity factor F on the y axis 52 that TSC analytics tool 22 may generate based on an analysis of the results of TSC 10 on a batch of translation content. Example linguistic marker graph 50 shows example mean averages of the linguistic markers L and F that TSC analytics tool 22 may determine for each of the match types over a selected sample of translation content, including an EM linguistic marker mean average 53 for the exact matches generated by translation memory (TM) 2, an FM linguistic marker mean average 54 for the fuzzy matches generated by TM component 2, and an MT linguistic marker mean average 55 for the machine translation segments generated by machine translation (MT) 3. (TSC analytics tool 22 may exclude automatic exact matches (AE) from this analysis.) EM, FM, and MT linguistic marker mean averages 53, 54, 55 may also may referred to EM, FM, and MT linguistic marker points 53, 54, 55, or simply as EM point 53, FM point 54, and MT 55, for convenience (and likewise for analogous linguistic marker mean averages described further below), keeping in mind that each linguistic marker point is a two-dimensional mean average of pairs of values of the two linguistic markers, leverage L and factor F, for each of multiple translation events in a batch of content translation by TSC 10.

Linguistic marker graph 50 also includes a "perfect match point" (PMP) 56 at the lower right corner. PMP 56 represents the ideal efficiency of TSC 10, in which cognitive leverage L is 1.0 (or 100%) and productivity factor F is 0. As shown in FIG. 4, TSC analytics tool 22 may display vectors, referred to as linguistic vectors, from each of the linguistic marker points 53, 54, 55 to PMP 56, including exact match (EM) linguistic vector 57, fuzzy match (FM) linguistic vector 58, and machine translation (MT) linguistic vector 59. The linguistic vectors 57-59 measure linguistic noise for the linguistic marker points 53-55 of each of the machine match types EM, FM, and MT, respectively. TSC analytics tool 22 may also analyze the linguistic noise of subcomponents of each of the machine match types EM, FM, and MT, such as by separately analyzing the linguistic noise of different segment sizes, or other categories, within the results for each machine match type instead of averaging over all the results for each machine match type. Within the linguistic marker coordinate system of linguistic marker graph 50, TSC analytics tool 22 may compute the linguistic vector for each such separate category as the displacement in both F and L of the results of that category from PMP 56.

The example of linguistic marker graph 50 of FIG. 4 may exhibit a fairly typical set of results in that the exact matches EM are the best matches, as reflected in EM point 53, followed by FM point 54, and then MT point 55. Exact matches tend to be the most efficient as previously human-finalized translations that have been pre-qualified by human professional linguists, such that the source segment is an exact match. This is reflected in EM point 53 having the shortest linguistic vector 57. Fuzzy matches tend to be the next best matches, as previous translations have been pre-qualified by a human professional linguist and the source segment is a close approximate or fuzzy match based on a fuzzy difference threshold. This is reflected in FM point 54 having the next shortest linguistic vector 58. Given that MT systems (models) may learn from the same linguistic assets that drive EM and FM efficiency, it follows that for a given scope and domain with rich quality linguistic assets, the MT linguistic vector may vary depending on the amount of linguistic noise in the process, but generally has a longer linguistic vector 59.

In terms of linguistic marker graph 50 of FIG. 4, TSC operational management system 20 and TSC analytics tool 22 may seek to improve aspects of the process flow of TSC 10 such that MT point 55 is moved toward FM point 54, the linguistic marker points 53-55 move closer to PMP 56, and/or the length of linguistic vectors 57-59 is reduced.

As indicated above, TSC analytics tool 22 may separately analyze multiple components of any of machine match types EM, FM, and MT according to categorizations such as segment sizes. In this case, the result data of linguistic markers may be, e.g., a 3×3 multidimensional data object, rather than a two-dimensional linguistic marker vector as depicted in linguistic marker graph 50 of FIG. 4. Various examples in this disclosure may still be represented in analytics visualizations in the form of two-dimensional linguistic marker graphs, with the understanding that in some examples, this is merely a convenience for representing multidimensional data objects.

While linguistic vectors are a useful measurement of noise within a plurality of dimensions (e.g., match type and segment size), linguistic vectors may not capture all useful information in measuring the total noise across the entire plurality of events within a "major key," e.g., a language, a shipment of finalized translated content, or a document. TSC analytics tool 22 may also define a "linguistic noise" variable as a measurement of the total noise across the entirety of translation events within a major key. TSC analytics tool 22 may determine linguistic noise as the sum of the linguistic vectors weighted by the percentage (%) of words for each match type respectively, e.g., MT Linguistic Vector×MT % Words=MT Linguistic Noise FM Linguistic Vector×FM % Words=FM Linguistic Noise EM Linguistic Vector×EM % Words=EM Linguistic Noise TSC analytics tool 22 may determine the total Linguistic Noise of a shipment or other major key as the sum of MT, FM, and EM Linguistic Noise. The Linguistic Noise may provide a useful measurement for analytics visualizations such as linguistic marker graphs or process behavior charts measured over a plurality of shipments or other major keys.

Linguistic marker graphs and aggregated measurements of linguistic noise across a plurality of events within a shipments or other major key generated by TSC analytics tool 22 may enable TSC analytics tool 22 to apply pattern recognition techniques to linguistic noise, to quantify and visualize linguistic noise patterns. Specifically, TSC analytics tool 22 may generate analytics visualizations that may reveal optimal, acceptable (or "nominal"), and outlier (or "below nominal"/"not nominal") patterns between MT, FM and EM Linguistic Markers or linguistic noise. TSC analytics tool 22 may thus identify root causes of linguistic noise that have substantial effect on the efficiency of TSC 10, and distinguish sources of linguistic noise that are negligible. In a variety of examples, TSC analytics tool 22 may determine a classification of nominal or not nominal for at least some of the translation segments based at least in part on the statistical analysis of the linguistic markers, and generate an indication of the classification of nominal or not nominal for the translation segments as part of the one or more analytics outputs.

TSC analytics tool 22 may determine a "two-dimensional linguistic noise area" value, or "LinguisticNoiseArea_2D," based on the analysis represented in a linguistic marker graph such as that shown in FIG. 4. The LinguisticNoiseArea_2 D variable is a unit of measurement that quantifies the relationship between EM, FM and MT Linguistic Marker points across multiple dimensions for a plurality of events within a shipment or other major key. A linguistic noise area value of zero identifies the optimal or ideal case.

Figure 5:
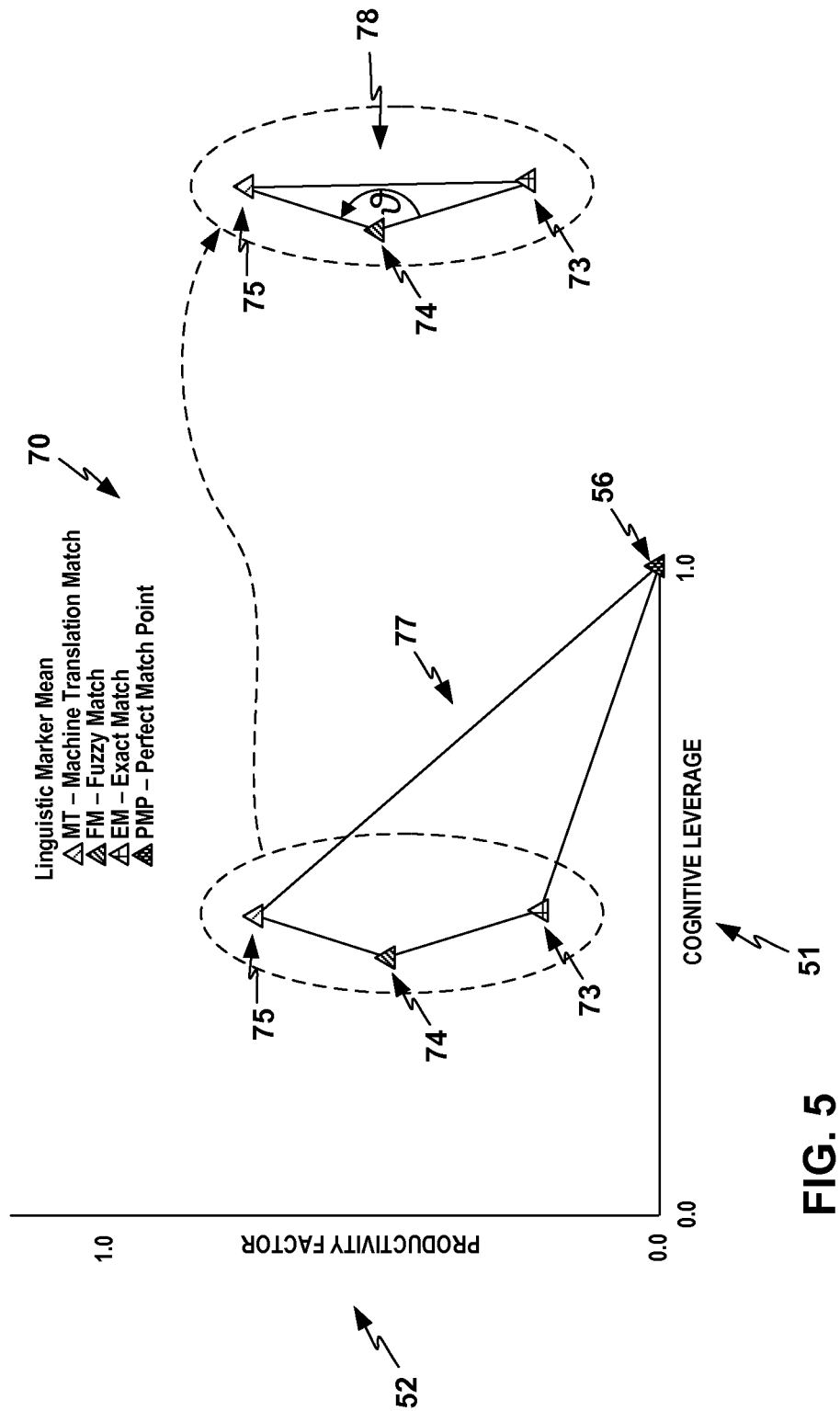
FIG. 5 shows an example linguistic noise area graph with a linguistic noise area that the TSC analytics tool may form as a quadrilateral area enclosed by apexes at the four points for the EM point, FM point, MT point, and PMP.

FIG. 5 shows an example linguistic noise area graph 70 with a linguistic noise area 77 that TSC analytics tool 22 may form as a quadrilateral area enclosed by apexes at the four points for EM point 73, FM point 74, MT point 75, and PMP 56 (where EM point 73, FM point 74, MT point 75 are defined as described above with reference to the analogous linguistic marker points of FIG. 4). In other examples, TSC analytics tool 22 may form a linguistic noise area 78 as the triangular area formed by apexes at EM point 73, FM point 74, and MT point 75, and characterized by an angle θ defined about FM point 74 from EM point 73 to MT point 75. TSC analytics tool 22 may use linguistic noise areas 77 and 78 in analysis using Linguistic Noise Pattern Recognition, as described further below.

TSC analytics tool 22 may include and apply a Linguistic Noise Pattern Recognition subsystem (LNPR) to analyze relationships between FM linguistic markers and MT and EM linguistic markers for analyzing patterns and assessing properties of the linguistic noise across various types of MT components. Specifically, these relationships may provide useful pattern insight into how to improve or optimize MT linguistic markers with reference to desired characteristics that promote efficiency in TSC 10 under control of TSC operational management system 20, as described as follows. TM component 2 may select the best FM matches from the translation match resources available to TM component 2. If MT component 3 uses the same translation match resources accessible to TM component 2 to train the MT resources used by MT component 3, and MT component 3 cannot learn more contexts than what it has been trained with, the noise in the translation match resources accessible to TM component 2 may be exhibited in both the FM and MT linguistic markers. If this is the case, the MT linguistic vector is normally greater than the FM linguistic vector; in other cases, MT component 3 may also use some additional contextual linguistic assets (e.g., dictionaries) to help MT component 3 learn more context than the resources used in MT training, so the MT linguistic vector may be close to or potentially shorter than the FM linguistic vector. In other words, the linguistic noise within FM matches may be a reflection of the linguistic noise used in the training or learning of the MT resources used by MT component 3. Thus, the size of the linguistic vectors between the FM linguistic marker point 74 and the MT and EM linguistic marker points 73 and 75 may offer a good indication of the quality or noise within the linguistic assets used during MT training or learning.

The angle θ about FM point 74 from EM point 73 to MT point 75 in linguistic noise area 78 may also provide insight into how the Linguistic Noise of a shipment or other major key is distributed. As shown in FIG. 5, the area of a linguistic noise area such as linguistic noise area 78 may visualize a good measurement of the relationship between the EM, FM and MT linguistic marker points. While different measurements may provide different insight, linguistic noise areas 77 or 78 may provide particular insight into the full range of noise distortion in TSC 10. Further details of how TSC analytics tool 22 may determine linguistic noise areas 77 and 78 and use Linguistic Noise Pattern Recognition (LNPR) to analyze linguistic noise distortion are described further below.

TSC analytics tool 22 may use pattern recognition systems and methods for doing in-depth statistical analysis of multiple operational variables. For example, it is possible that a plurality of shipments may have the same Linguistic Noise quantities, as determined by the FM and MT linguistic vectors multiplied by the percentage of words for each match type. However, at the same time, it may be very unlikely that two shipments would have the same linguistic noise values and the same 2D linguistic noise area values. Determining the 2D linguistic noise area values may thus provide greater insight into causes of linguistic noise in TSC 10 than linguistic noise quantities alone. Besides the example of linguistic noise area values, TSC analytics tool 22 may use a variety of other pattern recognition and statistical analysis systems and methods to characterize causes of linguistic noise in TSC 10.

Figure 6:
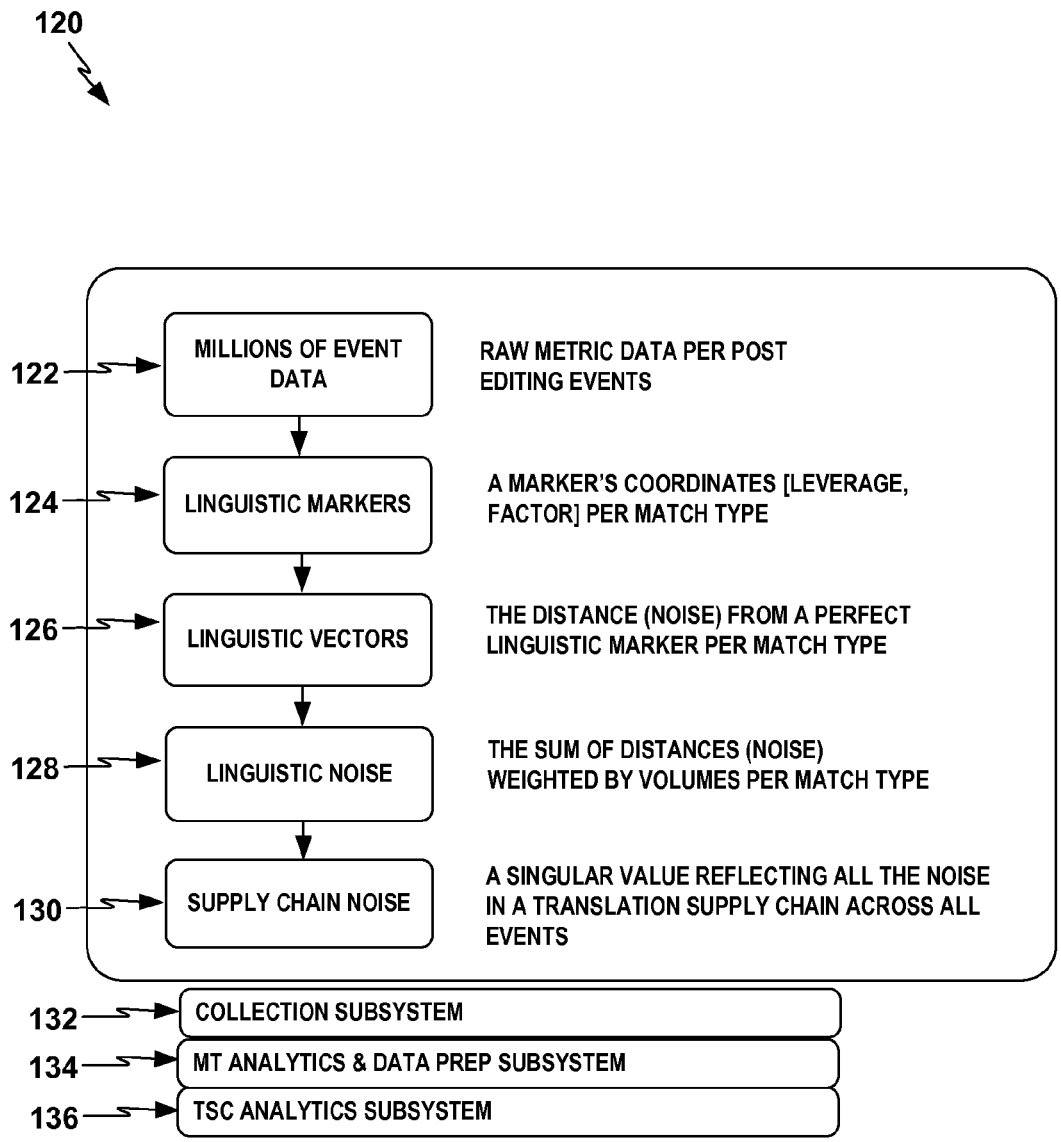
FIG. 6 depicts a flowchart for an example process that the TSC operational management system may perform to measure three core linguistic metrics, linguistic markers, linguistic noise, and supply chain noise, in relation to each other and to linguistic vectors, for downstream analysis and analytics visualization.

FIG. 6 depicts a flowchart for a process 120 that TSC operational management system 20 may perform to measure three core linguistic metrics, linguistic markers 124, linguistic noise 128, and supply chain noise 130, in relation to each other and to linguistic vectors 126, for downstream analysis and analytics visualization. In particular, TSC operational management system 20 may take in linguistic event data 122; use data 122 to determine linguistic marker points 124 in terms of leverage L and productivity factor F per match type; use linguistic markers 124 to determine linguistic vectors 126; determine linguistic noise 128; and determine supply chain noise 130. TSC operational management system 20 may use a collection subsystem 132, an MT analytics and data preparation subsystem 134, and a TSC analytics subsystem 136 to gather linguistic event data 122 from across TSC 10. By measuring the three core linguistic metrics 124, 128, and 130, TSC operational management system 20 may make it possible to take a single supply chain noise value and drill down into the linguistic noise per major key, drill down into the linguistic vectors per major key, and then drill down into the specific linguistic markers per major key. TSC operational management system 20 may apply these methods to drill down orthogonally across any level of major keys, such as shipments, documents, or segment levels.

Figure 7:
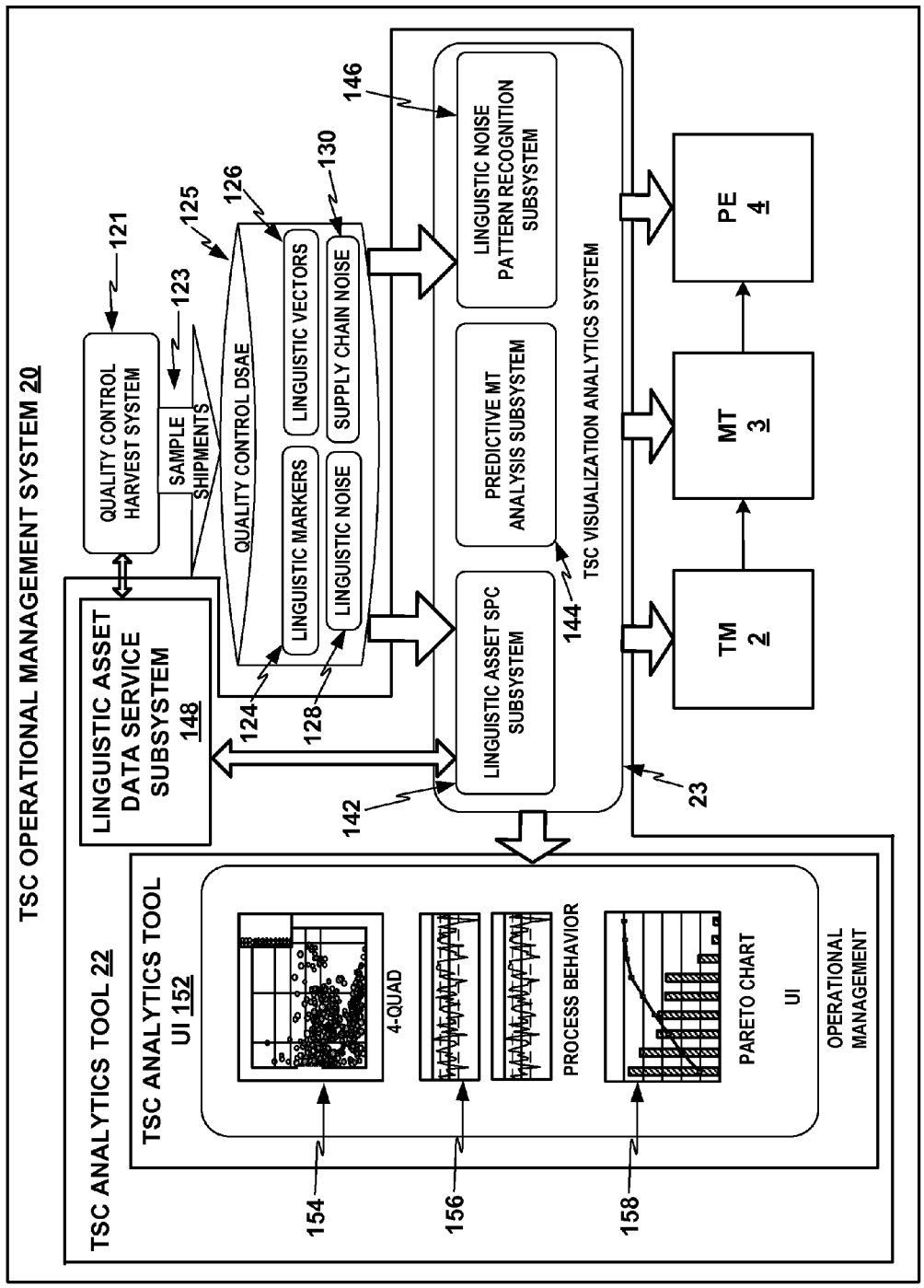
FIG. 7 shows a conceptual block diagram of an example TSC operation management system showing various example processes a TSC analytics tool may perform building on the underlying capabilities of a TSC operational management system.

FIG. 7 shows a conceptual block diagram of TSC operation management system 20 showing various example processes TSC analytics tool 22 may perform building on the underlying capabilities of TSC operational management system 20. TSC operation management system 20 may include a quality control harvest system 121 that may harvest translation event data (e.g., translation event data 122 of FIG. 6) of sample shipments 123 or other major keys to provide to a Quality Control Data Store and Analysis Engine 125 ("quality control DSAE 125"), which may perform the analyses described above to identify linguistic markers 124, linguistic vectors 126, linguistic noise 128, and supply chain noise 130. TSC operation management system 20 may then provide the results of those analyses, including linguistic markers 124, linguistic vectors 126, linguistic noise 128, and supply chain noise 130, to TSC analytics tool 22.

TSC analytics tool 22 may enable additional capabilities that build on the other capabilities of TSC operational management system 20 depicted in FIG. 6, such as to provide analytics visualizations and statistical process control (SPC). TSC analytics tool 22 includes TSC analytics visualization system 23 in this example. TSC analytics visualization system 23 includes linguistic asset statistical process control (SPC) subsystem 142, predictive machine translation (MT) analysis subsystem 144, and linguistic noise pattern recognition (LNPR) subsystem 146. TSC analytics visualization system 23 may perform techniques for analyzing linguistic markers 124, linguistic vectors 126, linguistic noise 128, and supply chain noise 130 to produce various types of analytics visualizations including statistical process control charts and drill-down analysis with linguistic asset SPC subsystem 142, predictive MT analysis with predictive MT analysis subsystem 144, and linguistic pattern analysis with LNPR subsystem 146, across a plurality of operational variables and across a plurality of the components of TSC 10. Linguistic asset SPC subsystem 142, predictive MT analysis subsystem 144, and LNPR subsystem 146 are described further below. TSC analytics visualization system 23 may also output results to translation memory (TM) component 2, machine translation (MT) component 3 and post editing (PE) component 4.

In an example drill-down analysis, TSC analytics visualization system 23 may enable a user to request analytics visualizations, and may in response perform one or more of the following techniques to generate analytics visualizations, such as in a TSC analytics tool user interface (UI) 152. TSC analytics visualization system 23 may aggregate a plurality of translation events into a plurality of classified "cases," where the cases are groups of translation events classified by characteristics such as match type and segment size; drill-down (e.g., with linguistic asset SPC subsystem 142) to view a linguistic noise Pareto chart 158 of all the cases to determine which case is the biggest contributor to the overall supply chain noise 130; enable a user to request a view of all events with the segment size and/or match type combinations; drill-down (e.g., with linguistic asset SPC subsystem 142) to view a linguistic noise process behavior chart 156 across all documents or other translation contents within the selected view to identify the documents or other translation contents exceeding a selected control limit; refine the view of all translation events within the documents or other translation contents in the selected view; drill-down (e.g., with linguistic asset SPC subsystem 142) to view a linguistic noise four-quadrant scatter plot 154 of all segments across the selected view to identify and report on the worst-performing segments; and/or enable a user to request the upstream components of TSC 10 to perform root cause analysis using the report on the worst-performing segments. Linguistic noise Pareto chart 158, linguistic noise process behavior chart 156, and linguistic noise four-quadrant scatter plot 154 are described further below.

Example predictive MT analysis subsystem 144 may identify which cases of TM and MT operational variables are predictors of MT matches generated by MT component 3 that needing or do not need correction by PE component 4. An example LNPR subsystem 146 may enable a user to create a plurality of pattern variables that can be correlated across a plurality of operational variables to perform statistical modeling. LNPR subsystem 146 may use statistical modeling to refine the cases to view via linguistic noise Pareto charts 158 and refine the control limits of the linguistic noise process behavior charts 156. The refinement of these charts 158 and 154 may enable users to detect and correct conditions in order to reduce the overall linguistic noise 128 within TSC 10.

TSC analytics visualization system 23 may also enable analytics visualizations using per component analysis, in which a user may define a data view embodying a plurality of operational variables, import a spreadsheet comprising the selected data view, and define and import a table of linguistic markers against a data view. The spreadsheet may enable root cause analysis of faults within their components. In another scenario, the component team is able to request statistical analytics and visualization subsystem or linguistic asset SPC subsystem 142 to produce one of the three process control charts 154, 156, 158 to assess how entities or vendors among the components of TSC 10 are performing relative to service level agreements. An example component analysis visualization may include a linguistic noise four-quadrant scatter plot 154 with the selected entity's or component's variables as markers, or linguistic marker points. Additional aspects of FIG. 7 are described further below after the context of FIG. 8 is introduced.

Figure 8:
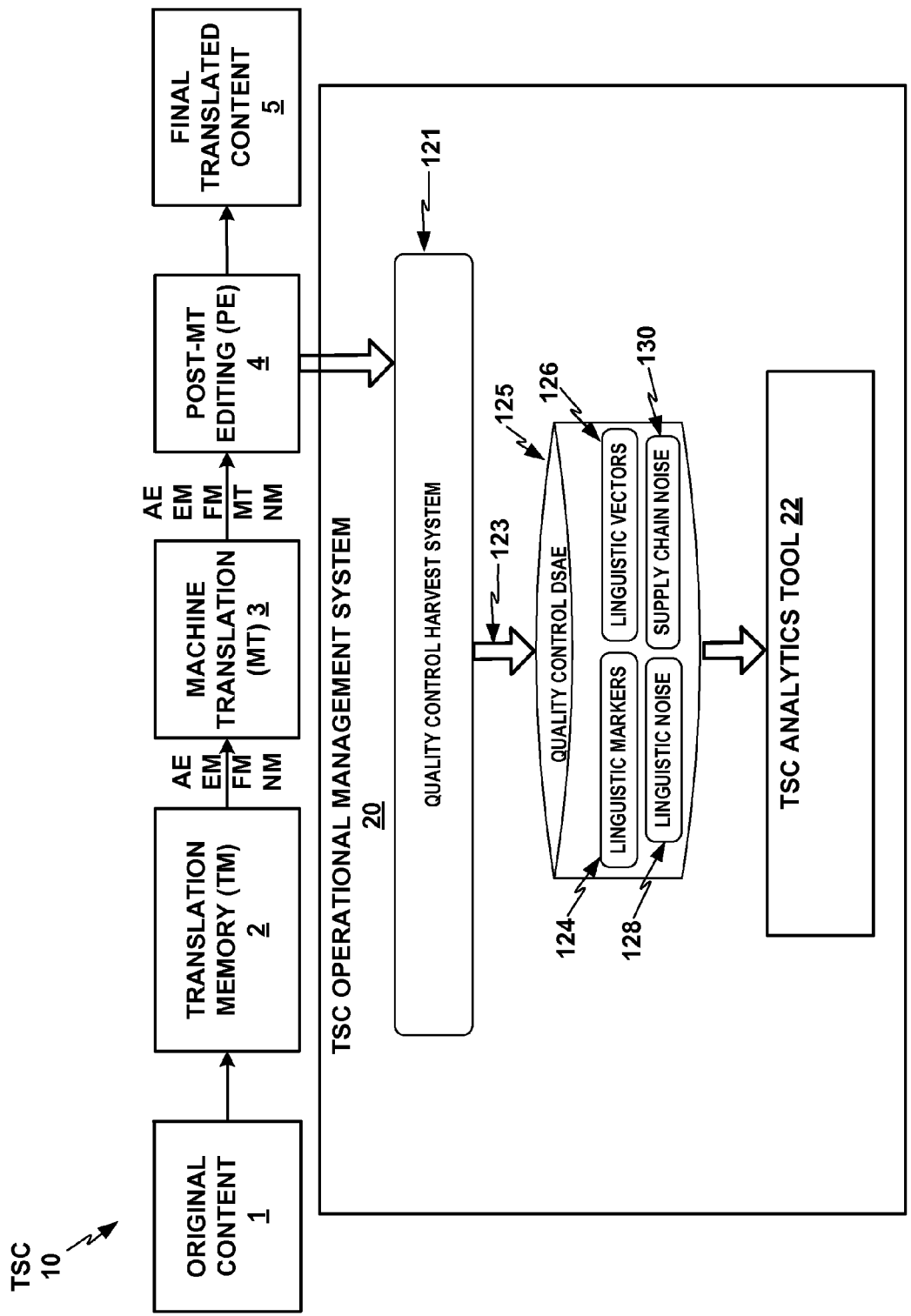
FIG. 8 shows a conceptual block diagram of a TSC operational management system as shown in FIG. 7 in interaction with a TSC in one example.

FIG. 8 shows a conceptual block diagram of TSC operational management system 20 as shown in FIG. 7 in interaction with TSC 10 in one example. TSC operational management system 20 includes quality control harvest system 121, which may receive from PE component 4 the results of TM component 2, MT component 3, and PE component 4. Quality control harvest system 121 may enable publishing and harvesting a plurality of operational variables per major key, and a number of components that can append their specific component metric data to matches before PE component 4. PE component 4 may create an event log per completed major key. When the respective TM (including EM and FM) and MT matches are used, the related component metric data is passed through to TSC analytics tool 22.

PE component 4 may include a computer-aided translation (CAT) editor, as described above. The CAT editor of PE component 4 may be enabled to collect and deliver raw translation event logs downstream to the quality control harvest system 121. The raw event logs may contain a number of variables per segment of translation content that may have originated from any one or more of components TM component 2, MT component 3, and/or PE component 4 of TSC 10. Each segment (or most of the segments) as input to PE component 4 may have one translation match of either EM, FM, or MT match type, and may have multiple matches of one or more of EM, FM, or MT type, to aid the human post editors in PE component 4 to select the best single match for each segment for the final translation. The CAT editor of PE component 4 may ensure that each segment is classified as EM, FM, or MT, according to the selected best match type, in the translation event logs the CAT editor delivers to quality control harvest system 121. Each segment may also be classified or binned by TSC operational management system 20 according to segment size, e.g., into one of three segment sizes, which the CAT editor may also include in the event log data it delivers to quality control harvest system 121. The size of a segment may have a high correlation with translation productivity and terminology improvement or optimization.

CDSA engine 125 may collect and transform event log data received from the CAT editor of PE component 4 via quality control harvest system 121 into a table. The net result may be that CDSA engine 125 extracts a number of operational variables per event and aggregates the operational variables per each major key. These operational variables may include information used for the core linguistic metric variables as indicated above, e.g., linguistic markers, linguistic vectors, linguistic noise, and supply chain noise. These operational variables may in some examples also include PE component markers of PE component 4, TM component markers of TM component 2, and/or MT component markers of MT component 3. Quality control DSAE 125 may output its results to TSC analytics tool 22, as described above.

LNPR subsystem 146 of TSC analytics tool 22, as shown in FIG. 7, may receive the results from quality control DSAE 125, import the core linguistic metrics, determine a set of linguistic patterns, and create a set of pattern variables per major key. LNPR subsystem 146 may store the pattern variables back into quality control DSAE 125. These pattern variables may be used downstream for linguistic asset SPC subsystem 142, predictive MT analysis subsystem 144, translation memory (TM) component 2, machine translation (MT) component 3, and/or post editing (PE) component 4, as shown in FIG. 7.

Predictive MT analysis subsystem 144 may receive the results from quality control DSAE 125, import the core linguistic metrics, perform predictive analytics to assess how likely MT matches exhibit specific behaviors that reduce human effort during PE component 4, and create predictive models of upstream component markers that may reduce the Linguistic Noise and improve or optimize the efficiency and capacity of PE quality components.

Linguistic asset SPC subsystem 142 may receive the results from quality control DSAE 125 and select a subset of operational variables based on a Filter Specification Language. The Filter Specification Language used by linguistic asset SPC subsystem 142 may specify the plurality of variables to be included within a "data view". For example, the specification "MTVendor=XYZ" could be used to create a data view filtered by an "MTVendor" variable representing a machine translation vendor operating as part of MT component 3. TSC analytics tool UI 152 may include a linguistic asset SPC subsystem UI component that may include a Filter Specification Language UI component (not shown in FIG. 7). The Filter Specification Language UI component may be enabled to receive user inputs of code or structured queries to specify the filter variables, in some examples. The Filter Specification Language UI component may also include UI elements such as buttons, sliders, and menus that may facilitate user inputs for specifying the filter variables. Linguistic asset SPC subsystem 142 may also enable creation of a "data view" (e.g., a table) for a subset of operational variables aggregated over a major key (e.g. shipment) based on variables selected with the Filter Specification Language.

Linguistic asset SPC subsystem 142 may also enable user selection of a set of display markers to be shown in a four-quadrant scatter plot 154. Each display marker may represents one of the linguistic markers (per EM, FM, and/or MT matches) aggregated over an operational variable. Linguistic asset SPC subsystem 142 may enable the display markers to be defined via a Marker Specification Language and computed or determined using a selected data view. The Marker Specification Language specifies the plurality of operational variables to be used for aggregating linguistic markers. For example, the Marker Specification Language may be used to specify showing the EM, FM and/or MT linguistic marker points (e.g., as shown in FIGS. 4 and 5) across a number of linguistic events for each quarter (e.g., per operational variable "quarter") or for each linguistic pattern (e.g., per operational variable "linguistic pattern class"). The Marker Specification Language UI component may also include UI elements such as buttons, sliders, and menus that may facilitate user inputs for specifying the operational variables to be used for aggregating linguistic markers. Linguistic asset SPC subsystem 142 may create four-quadrant marker tables 154 containing the linguistic markers aggregated per the marker specification variables. Linguistic asset SPC subsystem 142 may also store the four-quadrant marker tables 154 as separate objects in quality control DSAE 125 for downstream analysis.

Linguistic asset SPC subsystem 142 may enable creation of SPC charts based on the filtered data view selected above, including linguistic noise four-quadrant scatter plots 154, linguistic noise process behavior charts 156, and/or linguistic noise Pareto charts 158. TSC analytics tool UI may display any of these SPC charts 154, 156, 158, such as via a web portal or dashboard, as described further below. TSC analytics visualization system 23 may also output results, such as linguistic metric variables, pattern variables, and component (TM and MT) variables, to translation memory (TM) component 2, machine translation (MT) component 3 and/or post editing (PE) component 4, each of which may include computing systems or computer-implemented methods. TSC analytics tool 22 may also include a Linguistic Analytic Data Services (LADS) 148, which is described further below.

Quality control harvest system 121 may enable components of TSC 10 to attach the component markers to matches for downstream predictive analysis. For example, the TM component 2 and MT component 3 may attach specific component markers to the matches for each segment such that TM component 2 may communicate the component markers and matches attached together to MT component 3 and MT component 3 may communicate the component markers and matches attached together to PE component 4. CAT editor of PE component 4 may also communicate the component markers and matches attached together to quality control harvest system 121, from where they may be communicated to quality control DSAE 125 and TSC analytics tool 22.

For example, TM component 2 may export TM matches from TM memory into a transport format "TMX" (which may be any applicable transport format). Then, TM component 2 may add one or more component markers as an extension to at least some of the TM matches (either EM or FM) in the format "TM:xxx" for each component variable, using the format:

<TM:xxx> value </TM:xxx>

With the TM match memory modified with the component markers attached, TM component 2 may then import the TM modified memory as TMX. TM component 2 may subsequently transmit the EM and FM matches with attached component markers to MT component 3. MT component 3 may generate its own MT matches; export the MT matches from MT memory into an applicable transport format, e.g., "TMX;" and add one or more MT component markers to each of at least some of the matches, using the format:

<MT:xxx> value </MT:xxx>

MT component 3 may then import the MT modified memory in the transport format. MT component 3 may subsequently transmit the EM, FM, and MT matches with attached component markers to PE component 4.

PE component 4 may create an event log containing event metric data stored within the final set of matches from TM component 2 and MT component 3 as an event log object. Each event may contain metric data detailing the segment editing actions by TM component 2 and MT component 3. As each segment is translated, PE component 4 may also attach variables to the event within the log. For example, PE component 4 may attach PE variables (e.g., of format PE:xxxx) into the event entry. As another example, PE component 4 may attach component markers (e.g., TM:xxx and/or MT:xxx) into each event entry if a TM match or MT match is accepted in PE component 4 for composing the final translation 5.

Quality control harvest system 121 may extract the event log from PE component 4 as XML data using a Linguistic Quality Control Schema, where each operational variable per event is named and aggregated to each major key, e.g., language, shipment, or document. These operational events may be managed by quality control DSAE 125. The types of operational variables recognized or managed by quality control DSAE 125 may include core linguistic metric variables, base PE component markers, TM component markers, MT component markers, and linguistic noise pattern variables. In some examples, some of these types of operational variables may be required and others may be optional. For example, in some implementations, one or more of each of core linguistic metric variables, base PE component markers, and linguistic noise pattern variables may be required, while the TM component markers and MT component markers may be optional. Examples of each of the types of operational variables recognized or managed by quality control DSAE 125 are provided as follows; quality control DSAE 125 may also manage additional types of operational variables, and TSC analytics tool 22 may create or extend new types of operational variables.

The core linguistic metric variables may include: major keys (e.g., languages, shipments, documents); Linguistic Markers; Linguistic Vectors; Linguistic Noise; Supply Chain Noise; Total Words; Total Time; and NP Productivity Baseline, for example. The base PE component markers may include: PE:Keys Typed; PE:Words; PE:Time; PE:Proposed Best Match; and PE:Used Match, for example. The TM component markers may include: TM:Brand; TM:Division; TM:Domain ID; TM:Ontology Major; TM:Ontology Minor; and TM:Fuzzy Score, for example. The MT component markers may include: MT:ServiceID; MT:metricValue [List of (value, name)]; and MT:n-gram size, for example. The Linguistic Noise Patten variables may include: Linguistic Pattern Class; Linguistic Noise Area—2D; Linguistic Distortion—Inner; Linguistic Distortion—Outer; and EM Noise Threshold, for example.

Quality control harvest system 121 may use the base PE component markers to compute the linguistic markers, linguistic vectors, linguistic noise, and supply chain noise variables per major key. Quality control harvest system 121 may publish an XML schema for the import of linguistic quality information from any of TM component 2, MT component 3, and/or PE component 4.

The linguistic noise pattern recognition (LNPR) subsystem 146 may perform various functions of TSC analytics tool 22. LNPR subsystem 146 may provide pattern information that may facilitate reducing the Linguistic Noise across the process, components, and assets. Specifically, LNPR subsystem 146 may provide methods to quantify cases such as optimal, acceptable, and exception or outlier patterns between MT, FM and EM Linguistic Markers. LNPR subsystem 146 may be particularly focused on reducing a distance between MT linguistic markers and EM linguistic markers, and reducing a distance between FM linguistic markers and EM linguistic markers, e.g., reducing distances between the EM, FM, and MT linguistic marker points 53, 54, and 55 of FIG. 4 or of EM, FM, and MT linguistic marker points 73, 74, and 75 of FIG. 5.

LNPR subsystem 146 may apply pattern recognition tools among multidimensional patterns within a linguistic markers coordinate system such as linguistic noise area graphs 50 and 70 of FIGS. 4 and 5. The pattern recognition tools used by LNPR subsystem 146 may include analyzing and quantifying relationships between linguistic markers across multiple dimensions aggregated over a plurality of TSC operational variables. Example functions of LNPR subsystem 146 are described below within a single dimension of match types, e.g., the relationship between EM, FM and MT linguistic markers. While these examples are described within a single dimension, LNPR subsystem 146 is not limited to analyzing a single dimension but can be extended to analyzing linguistic markers across multiple dimensions. For example, the relationships between linguistic vectors used to measure the linguistic noise area of a triangle (e.g., as shown in FIG. 5) can be extended to analyze and quantify the relationships between planes to define a linguistic noise volume of pyramids defined in three dimensions, or of linguistic noise n-dimensional objects defined across n-dimensional spaces.

In some examples, linguistic markers evaluated by LNPR subsystem 146 may have a cognitive leverage L of 1.0 and a productivity factor F of 0.0, which may define a "perfect match case." Within the linguistic marker coordinate system, a perfect match case (with zero noise) occurs when the linguistic vector=0 for all match types and all scope levels, e.g., when there is no labor (productivity factor F=0.0) needed to correct the plurality of matches and the human professional linguist accepts 100% of all matches (cognitive leverage L=1.0) across the plurality of events in the sampled population. In a linguistic marker analytics visualization graph analogous to linguistic marker analytics visualization graphs 50 or 70 of FIG. 4 or 5, the perfect match case would be represented by EM, FM, and MT linguistic marker points 53, 54, and 55 or 73, 74, and 75 all coinciding with "perfect match point" (PMP) 56.

In some other examples, linguistic markers evaluated by LNPR subsystem 146 may define an "equal EM case," in which the EM, FM, and MT linguistic marker points all coincide with each other (but not with PMP 56). In other words, in the equal EM case, LNPR subsystem 146 evaluates the EM, FM, and MT match result averages all to have identical values for both cognitive leverage L and productivity factor F. In this case, the EM, FM, and MT linguistic vectors also all coincide, and all define the same angle (∠) relative to PMP 56. In this case, the techniques, the context, and the data used by TM component 2 and MT component 3 for any FM and MT matches, respectively, for any segments not covered by EM, are sufficiently rich and sophisticated to achieve just as good a job selecting matches as for EM.

Figure 9:
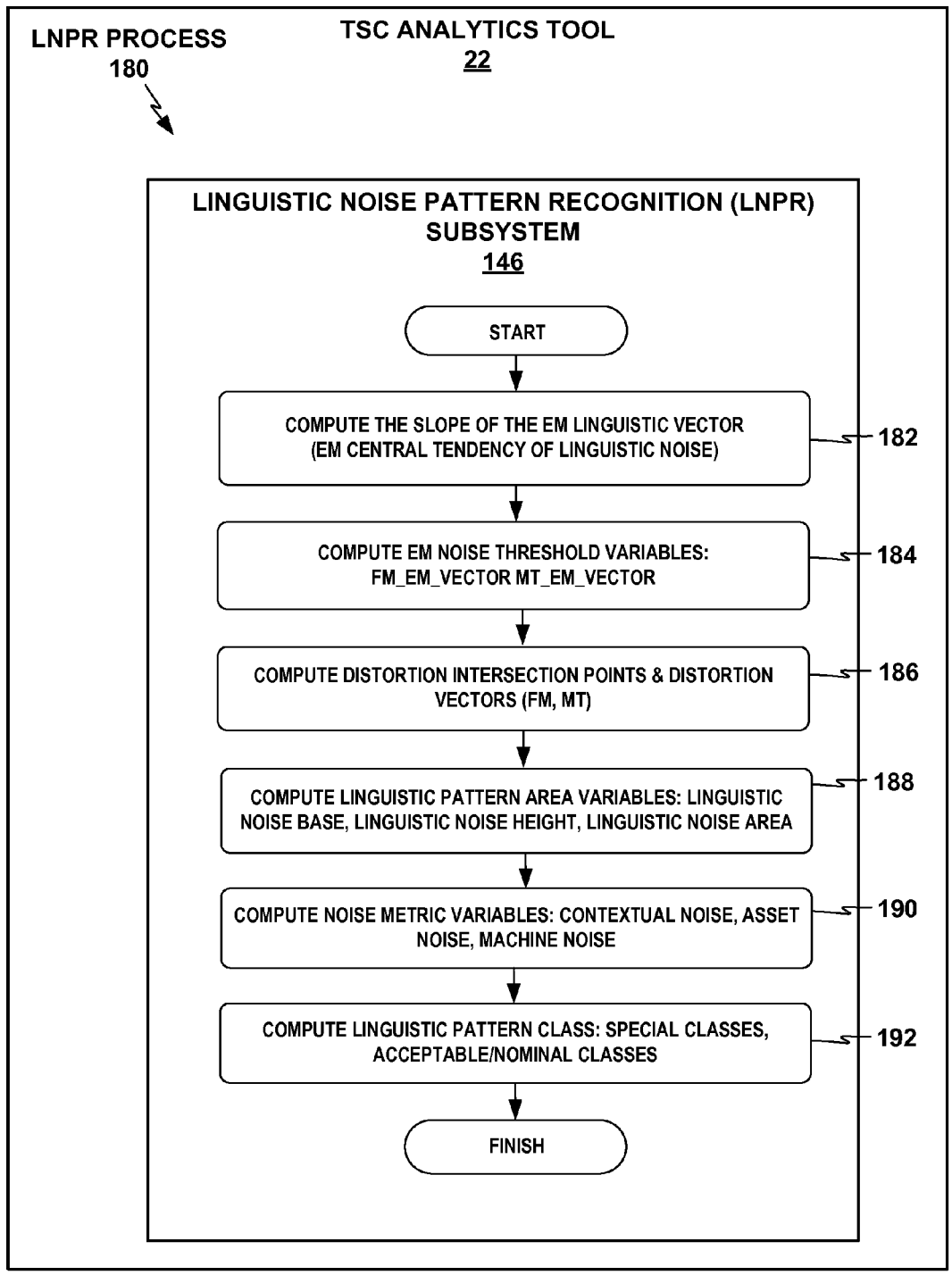
FIG. 9 depicts an example linguistic noise pattern recognition (LNPR) process that the LNPR subsystem of the TSC analytics tool may perform.

FIG. 9 depicts an example linguistic noise pattern recognition (LNPR) process 180 that LNPR subsystem 146 of TSC analytics tool 22 may perform. LNPR subsystem 146 may produce a set of linguistic pattern variables based on the linguistic events sampled across a number of major keys (e.g., shipments). LNPR subsystem 146 may compute the slope of the EM linguistic vector, e.g., the EM linguistic vector from EM point 73 to PMP 56 in FIG. 5 (182 in FIG. 9). LNPR subsystem 146 may define an extension of the EM linguistic vector as the "central tendency" of linguistic noise under statistically controlled TSC 10. LNPR subsystem 146 may compute EM noise threshold variables FM_EM Vector and MT_EM Vector (184), e.g., the vector from FM point to EM point and the vector from MT point to EM point. LNPR subsystem 146 may compute distortion intersection points and distortion vectors for FM and MT (186). LNPR subsystem 146 may compute linguistic pattern area variables of linguistic noise base, linguistic noise height, and linguistic noise area (188), as further discussed below. LNPR subsystem 146 may compute noise metric variables of contextual noise, asset noise, and machine noise (190). LNPR subsystem 146 may compute a linguistic pattern classification, and thereby determine special cases and acceptable cases (192).

The premise of using the EM linguistic vector as the "central tendency" of linguistic noise is that improving or optimizing the EM linguistic markers may facilitate improving or optimizing the FM linguistic markers and the MT linguistic markers over a number of major keys (e.g., shipments). Under this premise, LNPR subsystem 146 may use the EM linguistic vector as the primary parameter for measuring linguistic noise in TSC 10. The equal EM case reflects the optimal case of this premise.

Figure 10:
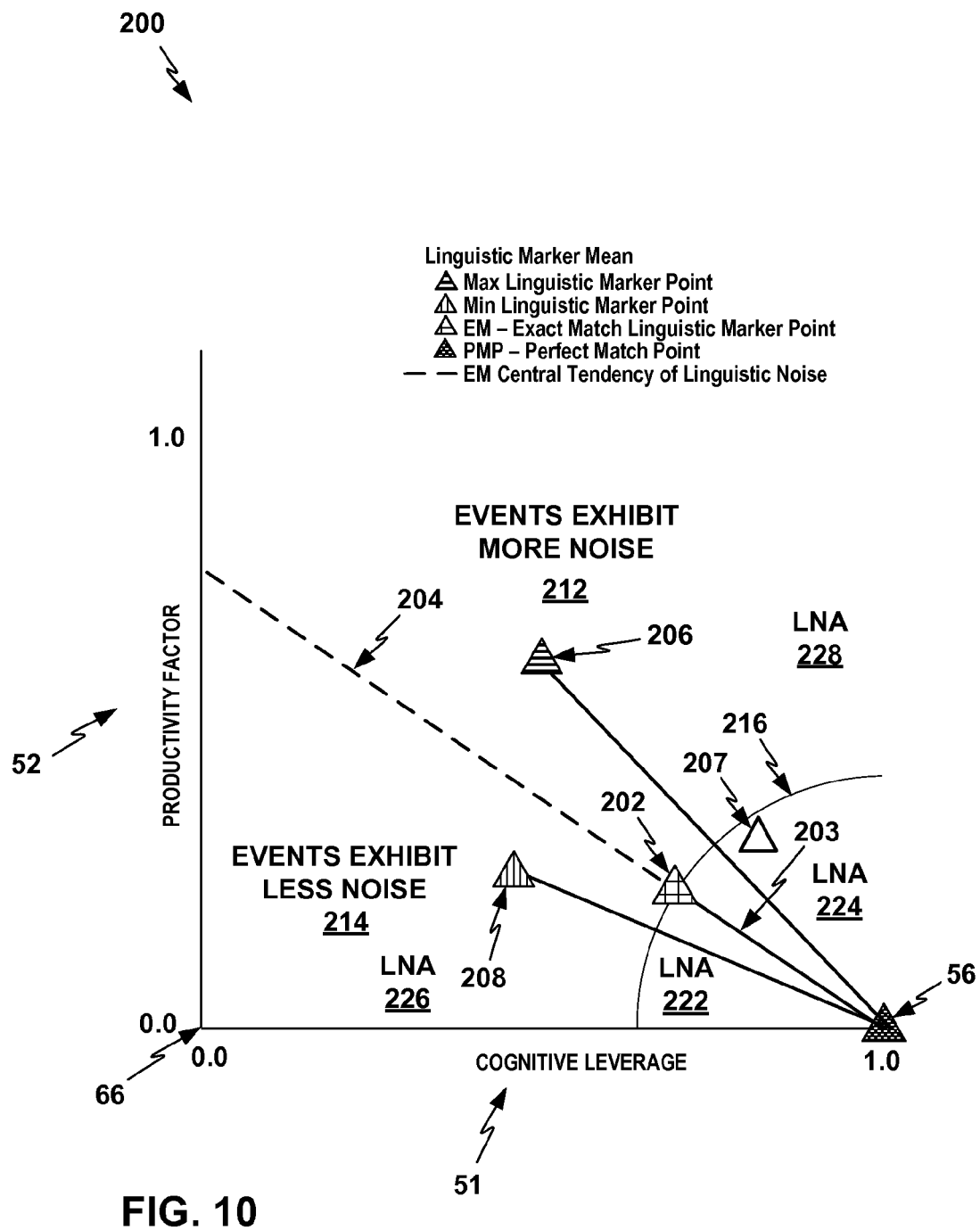
FIG. 10 depicts an example linguistic marker analytics visualization graph with analysis of linguistic noise, with cognitive leverage L on the x axis and productivity factor F on the y axis that the LNPR subsystem of the TSC analytics tool may generate.

FIG. 10 depicts an example linguistic marker analytics visualization graph 200 with analysis of linguistic noise, with cognitive leverage L on the x axis and productivity factor F on the y axis that LNPR subsystem 146 of TSC analytics tool 22 may generate based on an analysis of the results of TSC 10 on a batch of translation content, and with linguistic markers divided between above average linguistic noise and below average linguistic noise. Linguistic marker graph 200 of FIG. 10 illustrates the concept of the EM central tendency of linguistic noise. Specifically, the EM linguistic vector 203 defined from EM point 202 to PMP 56 may be extended along its slope across linguistic marker graph 200 as central tendency vector 204, such that linguistic marker graph 200 may be divided into two spaces representing above average linguistic noise (space 212) and below average linguistic noise (space 214).

Above average linguistic noise space 212 and below average linguistic noise space 214 may provide insight into the linguistic noise across the linguistic events across a major key (e.g., shipment). Specifically, events that occur in above average linguistic noise space 212 above EM central tendency vector 204 (e.g., event 206) have a greater than average product of cognitive leverage L and productivity factor F and exhibit greater than average linguistic noise; and events that occur in below average linguistic noise space 214 below EM central tendency vector 204 (e.g., event 208) have a lower than average product of cognitive leverage L and productivity factor F and exhibit lower than average linguistic noise. EM central tendency vector 204 is a reflection of the linguistic noise trends. The more pattern variables LNPR subsystem 146 can identify, the more it may facilitate pinpointing the exact cause of linguistic noise across TSC 10.

Linguistic marker graph 200 also shows an arc 216 defined by all linguistic points with the same vector length from PMP 56 as EM point 202. Arc 216 may serve as a basis for useful observations. Arc 216 may define a parameterized range of optimization solutions for achieving identical vector length from the ideal of PMP 56 as EM point 202, with boundary values defined at either end of arc 216 at cognitive leverage L=1 and at productivity factor F=0. Arc 216 may represent performance constraints in trying to optimize both leverage L and factor F at the same time. There may be diminishing returns to trying to optimize for either boundary value of arc 216: optimizing operations of PE component 4 for 100% acceptance of matches such that leverage L=1.0 on arc 216 would mean less labor would be needed but fewer bad matches were accepted, and optimizing operations of PE component 4 for zero labor such that factor=0.0 on arc 216 would mean that not all matches were accepted yet no labor is performed to resolve bad matches. This case can occur if source segments do not need to be translated. The operational team using TSC operational management system 20 may use this data to assess if some filters could be built to detect additional segments not needing translation to avoid labor in the PE component 4.

EM central tendency vector 204 may represent a goal angle for balancing improvement or optimization of both cognitive leverage L and productivity factor F at the same time, for operations to implement balanced reductions of each of the linguistic vectors for EM, FM, and MT. The absolute value of a linguistic vector's angle away from EM central tendency vector 204, in either direction, may be taken as a measure of balance in optimization of both cognitive leverage L and productivity factor F. This angle may be referred to as the arc angle of linguistic noise ("arcLN"). LNPR subsystem 146 may generate analytics visualizations that indicate arcLN and use arcLN for analytics that indicate practices for improving performance of PE component 4 in ways that balance improvement of both cognitive leverage L and productivity factor F.

Linguistic marker graph 200 of FIG. 10 may be further subdivided into four areas, defined by dividing both above average linguistic noise space 212 and below average linguistic noise space 214 by arc 216, which may be referred to as linguistic noise areas. Linguistic noise area (LNA) 222 is the section of space 214 within arc 216 and closer to PMP 56 than arc 216, such that matches within LNA 222 exhibit minimal linguistic noise; LNA 224 is the section of space 212 within arc 216 and closer to PMP 56; LNA 226 is the section of space 214 outside of arc 216 and farther from PMP 56 than arc 216; and LNA 228 is the section of space 212 outside of arc 216, where matches generally exhibit the most linguistic noise of any of the four linguistic noise areas. Competing matches with linguistic marker points that fall into LNAs 224 and 226 pose what may be referred to as a Linguistic Noise Dilemma.

For example, match points 207 and 208 may be competing matches for the same segment, where match point 207 is within LNA 224 and has higher cognitive leverage, and match point 208 is within LNA 226 and has lower productivity factor (and thus higher productivity). It may be unclear which of match points 207 and 208 has less linguistic noise. Competing match points 207 and 208 reflect the operational challenge when integrating linguistic components and techniques that optimize one dimension at the expense of another, e.g., improve or optimize productivity (minimize productivity factor F) at the expense of making cognitive assessments harder (lower cognitive leverage L).

The angle between a match point, PMP 56, and zero point 66 may be defined as the linguistic distortion angle for that match point or for the Linguistic Vector of that match point. While FM and MT linguistic marker points are generally farther from PMP 56 than EM point 202, each of FM and MT linguistic marker points may have a linguistic distortion angle that is greater than, equal to, or less than the linguistic distortion angle of EM point 202 and of EM central tendency vector 204. The variance in the size of the linguistic vectors, the angle of each linguistic vector, and the relationship of the FM and MT linguistic vectors to the EM linguistic vector represent different patterns of linguistic noise within TSC 10. LNPR subsystem 146 may use EM linguistic vector to qualify different patterns of linguistic noise of each major key (e.g., shipment).

Specifically, if $\angle(M)$ is defined as the angle between the points [m, PMP, and zero point (0.0,0.0)] where m=linguistic marker point (L,F) for EM, FM, or MT, and the FM and MT linguistic marker points are defined as min and max linguistic marker points depending on which of the two is closer to PMP 56 (min) and which is farther from PMP 56 (max), the following patterns may be observed in the relationships between the EM, Min, and Max linguistic marker points:

$\angle(EM)=\angle(min)=\angle(max)$: special case $\angle(EM)<\angle(min)<\angle(max)$: EM matches have the least amount of noise $\angle(min)<\angle(EM)<\angle(max)$: the min linguistic marker has less noise than the EM matches $\angle(min)<\angle(max)<\angle(EM)$: the EM match has the most amount of noise The angle of each linguistic vector relative to PMP 56 may reflect a property of the linguistic noise for the corresponding match type in TSC 10. The smaller the angle is, the closer the linguistic vector approaches the Leverage axis and the less linguistic noise is exhibited by the linguistic marker point for a given match type and major key.

Figure 11:
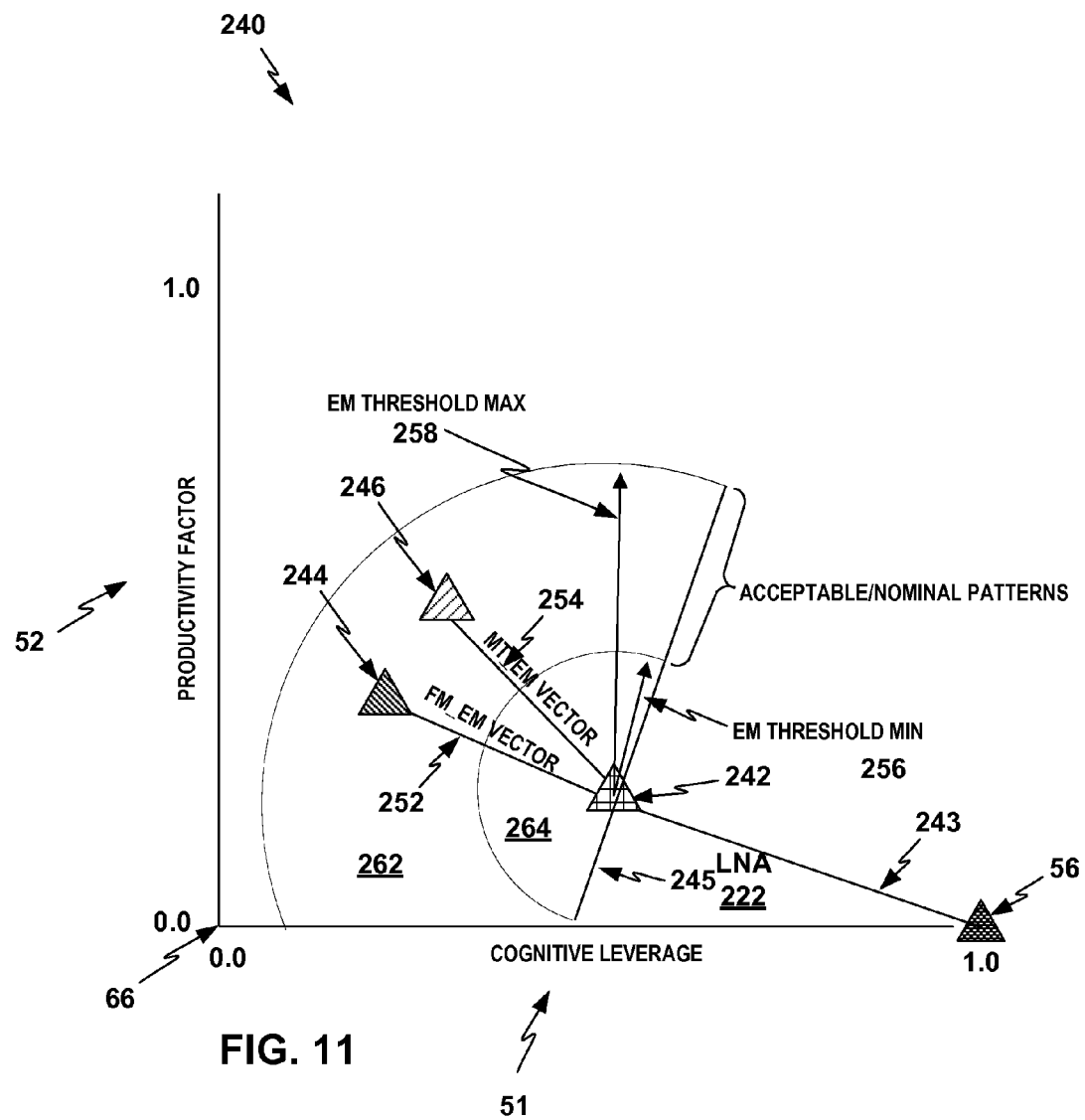
FIG. 11 depicts an example linguistic marker analytics visualization graph with FM-EM and MT-EM vectors, and with EM threshold vectors that parameterize ranges of nominal FM and MT performance relative to EM.

FIG. 11 depicts an example linguistic marker analytics visualization graph 240 with FM-EM vector 252 and MT-EM vector 254, and with EM threshold vectors 256, 258 that parameterize ranges of nominal FM and MT performance relative to EM. Generally, the closer the FM point 244 and MT point 246 are to EM point 242, the less linguistic noise is exhibited by TSC 10. LNPR subsystem 146 may thus determine FM-EM and MT-EM vectors and EM threshold vectors to quantize the analysis of the linguistic noise of TSC 10. LNPR subsystem 146 may determine FM-EM vector 252 between FM point 244 and EM point 242, and MT-EM vector 254 between MT point 246 and EM point 242 in linguistic marker graph 240, for each of a number of major keys. LNPR subsystem 146 may define EM min threshold unfixed vector 256 as the shortest, or average or other function of a sample of multiple shortest, of a potentially large number of FM-EM vectors and/or MT-EM vectors over a potentially large number of comparable major keys. (EM min threshold unfixed vector 256 is considered an "unfixed vector" rather than a true vector because LNPR subsystem 146 may define it in terms of a fixed vector length and fixed EM point 242 defining one end, but without the second end fixed, such that the unfixed vector may be freely rotated about EM point 242, as further explained below.) Analogously, LNPR subsystem 146 may define EM max threshold unfixed vector 258 as a function of a sample of relatively greater instances of a potentially large number of FM-EM vectors and/or MT-EM vectors over a potentially large number of comparable major keys. EM min threshold unfixed vector 256 and EM max threshold unfixed vector 258 may thus be used to define nominal performance standards or bases of comparison for LNPR subsystem 146 to evaluate FM and MT linguistic noise relative to EM for analysis of new major keys.

As previously, linguistic marker graph 240 may be generated by LNPR subsystem 146 of TSC analytics tool 22 based on an analysis of the results of TSC 10 on major keys or batches of translation content, defined with cognitive leverage L on the x axis and productivity factor F on the y axis. LNPR subsystem 146 may also define EM linguistic vector 243 from EM point 242 to PMP 56. LNPR subsystem 146 may further define EM linguistic basis 245 orthogonal to EM linguistic vector 243 through EM point 242. LNPR subsystem 146 may then define nominal performance space 262 depicted in FIG. 11 as the semicircle formed by rotating EM max threshold unfixed vector 258 about EM point 242, bounded by EM linguistic basis 245. LNPR subsystem 146 may also define exceptional performance space 264 depicted in FIG. 11 (indicating exceptionally good performance, which LNPR subsystem 146 may use to define a standard of "optimal" performance) as the smaller semicircle formed by rotating EM min threshold unfixed vector 256 about EM point 242, bounded by EM linguistic basis 245.

EM max threshold unfixed vector 258 and EM min threshold unfixed vector 256 may thus be considered control limits for linguistic noise in TSC 10, which TSC analytics tool 22 may provide for TSC operation management system 20 to implement in the operational management of TSC 10. LNPR subsystem 146 may define these control limits a priori using linguistic noise Pareto charts 158 as introduced above and further described below, based on aggregations of FM points and MT points within a major key or within a collection of comparable major keys. TSC operation management system 20 may use the control limits such as EM max threshold unfixed vector 258, and the nominal performance space 262 defined by EM max threshold unfixed vector 258, such as to flag results of TSC 10, such as FM results from TM component 2 or MT results from MT component 3, that LNPR subsystem 146 determines to fall outside of control limits such as nominal performance space 262. LNPR subsystem 146 may determine the control limits as a function of "standard" performance error as LNPR subsystem 146 statistically determines over potentially large sets of linguistic events and major keys processed by TSC 10, such as for all major keys processed by TSC 10 over a period of one or more months up to several years, in some examples.

Table 2 below illustrates an example of how LNPR subsystem 146 may classify a given major key given a set of measurements for FM-EM vector 252, MT-EM vector 254, EM min threshold unfixed vector 256, and EM max threshold unfixed vector 258:

TABLE 2

| | MT_EM_Vector < EM_Threshold_Min | EM_Threshold_Min < MT EM_Vector < EM_Threshold_Max | MT EM_Vector > EM_Threshold_Max |
|---|---|---|---|
| FM_EM_Vector < EM_Threshold_Min | Exceptionally good/ optimal | Nominal | Sub-nominal exception |
| EM_Threshold_Min < FM EM_Vector < EM_Threshold_Max | Nominal | Nominal | Sub-nominal exception |
| FM_EM_Vector > EM_Threshold_Max | Sub-nominal exception | Sub-nominal exception | Extreme sub-nominal exception |

Figure 12:
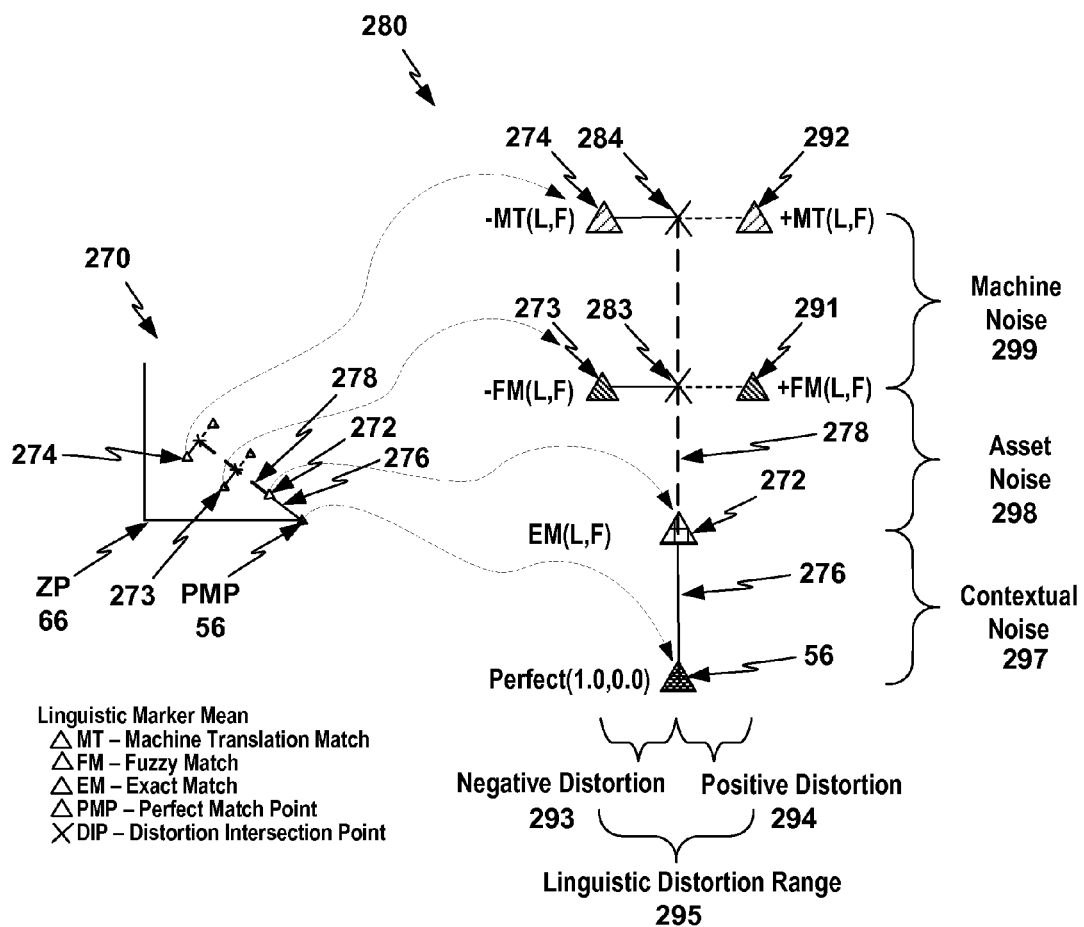
FIG. 12 depicts an example linguistic marker analytics visualization graph with a corresponding Distortion Intersection Point graph.

FIG. 12 depicts an example linguistic marker analytics visualization graph 270 with a corresponding Distortion Intersection Point graph 280. Linguistic marker graph 270 includes EM point 272, FM point 273, MT point 274, PMP 56, and zero point (or coordinate system origin) 66. Linguistic marker graph 270 also includes EM linguistic vector 276 defined from EM point 272 to PMP 56, and EM central tendency vector 278 defined as an extension of EM linguistic vector 276, all of which are also shown in a rotated vertical view in Distortion Intersection Point graph 280. The angle of each FM and MT linguistic vector relative to EM linguistic vector 276 may reflect distortion in linguistic noise. The greater the angle of the FM or MT linguistic vector relative to EM linguistic vector 276, the more linguistic noise is exhibited by the TM component 2 or the MT component 3, respectively, of TSC 10. LNPR subsystem 146 may define "distortion intersection points" 283 and 284 as alternative representations (besides the angle between pairs of linguistic vectors) of the information on FM and MT linguistic noise. LNPR subsystem 146 may define an orthogonal vector (or equivalently, shortest-path vector) between FM point 273 and EM central tendency vector 278, the intersection of which defines FM distortion intersection point 283. Analogously, LNPR subsystem 146 may define an orthogonal (or equivalently, shortest-path) vector between MT point 274 and EM central tendency vector 278, the intersection of which defines MT distortion intersection point 284.

The FM and MT distortion vectors from FM point 273 to FM distortion intersection point 283 and from MT point 274 to MT distortion intersection point 284, respectively, may be referred to as representing "negative distortion" 293 because they represent lower linguistic distortion than at EM central tendency vector 278. Distortion Intersection Point graph 280 also shows alternative examples of FM and MT points 291 and 292, respectively, with equal length but opposite direction FM and MT distortion vectors about EM central tendency vector 278 that represent "positive distortion" 294 because they represent greater linguistic distortion than at EM central tendency vector 278. The positive and negative distortion together may be referred to as the linguistic distortion range 295.

EM point 272, FM distortion intersection point 283, and MT distortion intersection point 284 may also be used to divide the total linguistic noise into three separate sections: contextual noise 297, linguistic asset noise 298 (or simply asset noise 298), and machine noise 299. Contextual noise 297 represents linguistic noise that separates EM point 272 from PMP 56, and may be due to differences in surrounding contexts of segments relative to the sources of the exact matches that makes the matches sub-optimal for the segments despite being exact matches for the segments themselves. Asset noise 298 represents the additional linguistic noise that separates FM distortion intersection point 283 from EM point 272, and may be due to additional linguistic noise introduced by the linguistic assets in TM component 2 that produced sub-optimal fuzzy matches for segments. Machine noise 299 represents the additional linguistic noise that separates MT distortion intersection point 284 from FM distortion intersection point 283, and that may represent additional linguistic noise introduced by imperfect machine translation techniques or training data of MT component 3 that produced sub-optimal machine translation matches for segments.

While FIG. 12 depicts FM point 273 and MT point 274 as both having the same magnitude of distortion, and as both having negative distortion, in other examples, the FM point and the MT point are more likely to have different magnitudes of distortion, and may have any combination of negative and/or positive distortion. In cases of unequal magnitude distortion, whichever of the FM point or the MT point has lower magnitude distortion (i.e., defines a linguistic vector with smaller angle from EM central tendency vector 278) may have its associated linguistic vector referred to as the inner linguistic vector, while whichever of the FM point or the MT point has greater magnitude distortion (i.e., defines a linguistic vector with greater angle from EM central tendency vector 278) may have its associated linguistic vector referred to as the outer linguistic vector.

Figure 13:
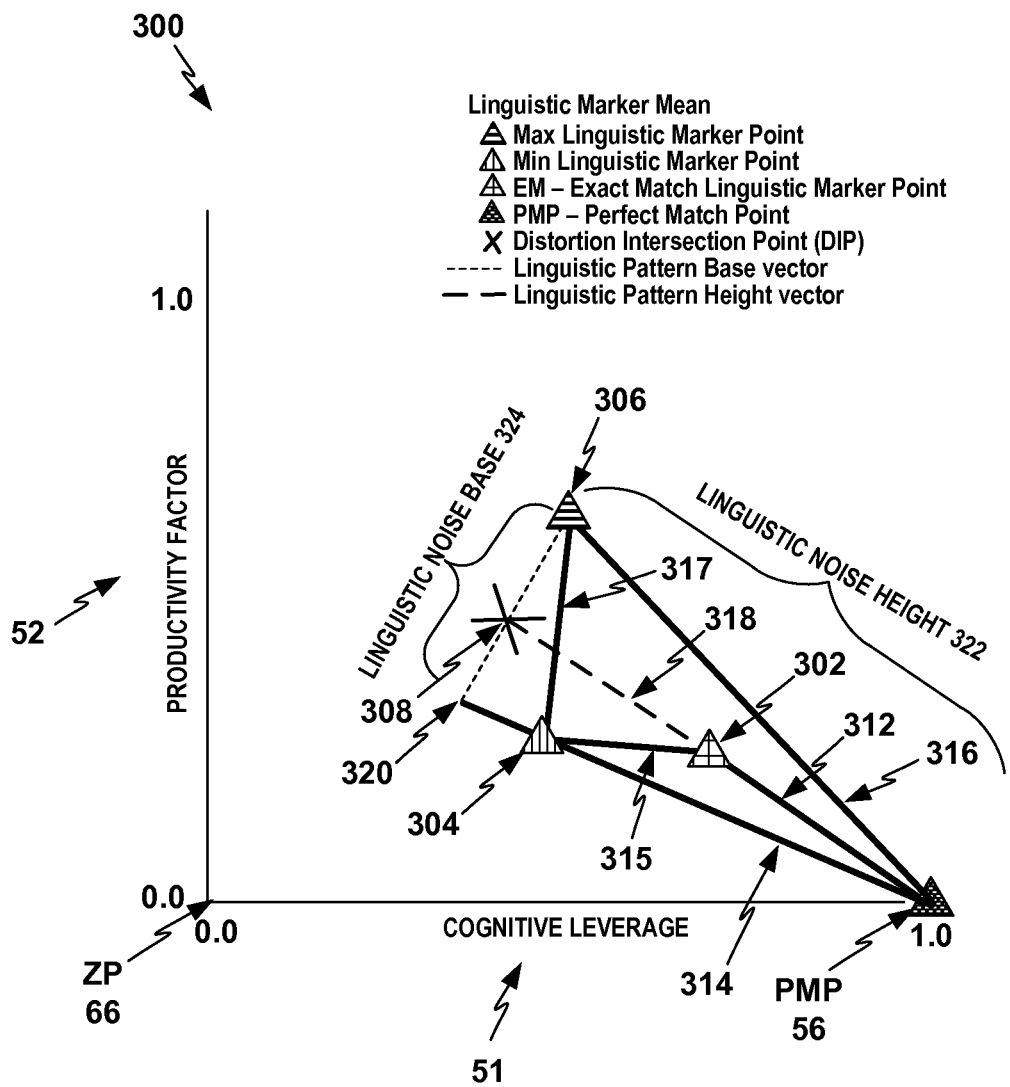
FIG. 13 depicts an example linguistic marker analytics visualization graph that the LNPR subsystem may generate in association with determining a linguistic noise area of a set of linguistic markers.

FIG. 13 depicts an example linguistic marker analytics visualization graph 300 that LNPR subsystem 146 may generate in association with determining a linguistic noise area of a set of linguistic markers. Linguistic marker graph 300 shows EM point 302, min linguistic marker point 304, and max linguistic marker point 306, defining respective vectors EM linguistic vector 312, min linguistic marker vector 314, and max linguistic marker vector 316 to PMP 56. Min linguistic marker point 304 and max linguistic marker point 306 may each be either of an FM point or an MT point, whichever has a shorter or longer linguistic vector, respectively. Max linguistic marker vector 316 defines a max distortion intersection point 308 on EM central tendency vector 318, in accordance with determination of distortion intersection points as described above. The FM and MT linguistic marker vectors may also be referred to alternately as a lower vector and an upper vector, based on whichever has the lesser and greater, respectively, angle from their linguistic marker point to PMP 56 to zero point 66. Thus, in the example of FIG. 13, min linguistic marker vector 314 is the lower vector and max linguistic marker vector 316 is the upper vector.

The magnitude of EM central tendency vector 318 may also be taken to define a linguistic noise height 322, and LNPR subsystem 146 may further define a linguistic noise base 324 as a line segment or basis with max linguistic marker point 306 at one end, intersecting max distortion intersection point 308 orthogonally to EM central tendency vector 318, and the other end defined by an intersection 320 with an extension of min linguistic marker vector 314 (note that this is not identical to linguistic distortion range). LNPR subsystem 146 may then define a linguistic noise area as the area within the triangle bounded by the extension of min linguistic marker vector 314 out to intersection 320; max linguistic marker vector 316; and linguistic noise base 324, or, one-half times linguistic noise height 322 times linguistic noise base 324. The linguistic noise area thus defined may serve as a useful analytical parameter of total linguistic noise in TSC 10 for the collection of translation batches or the period under analysis.

Since the linguistic noise height 322 is also equal in magnitude to EM central tendency vector 318, it is also equal to the sum of contextual noise, asset noise, and machine noise, as described with reference to FIG. 12 and as further described below in some examples, and which LNPR subsystem 146 may use for linguistic metrics for analytics of TSC 10. Contextual noise metric may include core noise due to new context in the translation content and is represented by EM linguistic vector 312. Asset noise may include noise originating in translations used for training models and/or customizing rules for translation memory fuzzy matches and is represented by the distance from the EM linguistic vector to the FM distortion intersection point. Machine noise may include noise originating from algorithm bias in MT processing and is represented as the distance from the FM distortion intersection point to the MT distortion intersection point.

LNPR subsystem 146 may further define metric vectors for each of these three components of linguistic noise, using the EM, FM and MT linguistic marker points themselves and not the FM and MT distortion intersection points. LNPR subsystem 146 may set a contextual noise metric vector equal to EM linguistic vector 312. LNPR subsystem 146 may then define an asset noise metric vector 315 between FM point 304 and EM point 302, and a machine noise metric vector 317 between MT point 306 and FM point. Asset noise metric vector 315 and machine noise metric vector 317 are thus greater than asset noise and machine noise themselves, and in general, the asset noise and machine noise metric vectors are greater than or equal to the asset noise and machine noise. LNPR subsystem 146 may equivalently determine the asset noise metric vector and machine noise metric vector in accordance with the following equations:

$$\text{Asset Vector} = \frac{FM\ LinguisticVector}{\cos\left(\tan^{-1}\left(\frac{FM\ \text{Factor}}{1.0 - FM\ \text{Leverage}}\right) - \tan^{-1}\left(\frac{EM\ \text{Factor}}{1.0 - EM\ \text{Leverage}}\right)\right)} - EM\ LinguisticVector$$

$$\text{Machine Vector} = MTVector - \text{Asset Vector} - EM\ LinguisticVector$$

$$MTVector = \frac{MT\ LinguisticVector}{\cos\left(\tan^{-1}\left(\frac{MT\ \text{Factor}}{1.0 - MT\ \text{Leverage}}\right) - \tan^{-1}\left(\frac{EM\ \text{Factor}}{1.0 - EM\ \text{Leverage}}\right)\right)}$$

In special cases in which LNPR subsystem 146 initially determines the asset noise metric vector or machine noise metric vector to be less than zero or negative, such that the FM point or the MT point, respectively, is closer than EM point 302 to PMP 56, LNPR subsystem 146 may override the initially determined value with an override to setting them to zero. In cases in which LNPR subsystem 146 determines the machine noise metric vector to be less than the contextual noise metric vector, this may indicate that MT component 3 has more sophisticated or higher-performing techniques than or superior knowledge to the resources used by TM component 2 to generate exact matches, and LNPR subsystem 146 may respond to this determination by generating an alert or other output indicating that TM component 2 may be likely to be a priority for improving performance of TSC 10. In cases in which LNPR subsystem 146 determines that the machine noise metric vector to be less than the sum of the asset noise metric vector plus the contextual noise metric vector, this may indicate that MT component 3 has been able to aggregate sufficient knowledge or performance capability relative to TM component 2 and PE component 4 that further improvement of MT component 3 is a lower priority than improving TM component 2 or PE component 4 for improving performance of TSC 10. In a variety of examples, TSC analytics tool 22 may indicate either the production of exact matches by TM component 2, the production of fuzzy matches by TM component 2, or MT component 3 as a priority for resolving linguistic noise in TSC 10.

LNPR subsystem 146 may more specifically classify various patterns of linguistic noise in performance of TSC 10 as reflected in linguistic marker analytics visualization graphs into four special case classes and nine acceptable or nominal pattern classes. These four special case classes and nine acceptable or nominal pattern classes may each generalize aspects of relevant information about the performance of TSC 10 over a potentially large batch of analyzed major keys of translation content, e.g., over a period of months or a year or more.

The four special case classes are zero noise, equal EM, better than EM, and special exception. The zero noise special case class refers to cases in which the EM, FM, and MT points all intersect PMP 56, indicating that all of the match types are free of linguistic noise. The equal EM special case class refers to cases in which the FM and MT points coincide with or are within a very short distance of the EM point, such that the FM-EM vector and the MT-EM vector are less than the EM min threshold unfixed vector, as described above with reference to FIG. 11. This indicates exceptionally good or optimal performance of both TM component 2 and MT component 3, as indicated above in Table 2.

The better than EM special case class refers to cases in which either the FM linguistic vector or the MT linguistic vector are shorter than the EM linguistic vector, indicating that the fuzzy match production by TM component 2, or MT component 3, respectively, is producing better results than the exact match production by TM component 2, indicating high-performance translation techniques combined with superior techniques for determining linguistic context for the translation segments than the exact match production by TM component 2. For example, in one case, the MT point may have higher productivity factor F but also much higher cognitive leverage L than either the EM or FM points such that the MT linguistic vector is shorter than either the EM or FM points.

The special exception class indicates that both MT Leverage>FM Leverage>EM Leverage, and EM Factor<FM Factor<MT Factor. This case indicates that the human professional linguists are choosing the MT/FM matches at an abnormal frequency without a significant productivity gain. This may occur, for example, when the translation content includes computer program code with code comments included in the code, such that TSC 10 performs translations of the human natural language code comments without disturbing the surrounding computer program code. In this case, lack of surrounding natural language context may pose exceptional challenges for generating translation matches, and translation of code comments tends to require higher-frequency, lower-productivity human activity in PE component 4 in selecting and finalizing translation matches, but for reasons unrelated to the general translation performance of TSC 10, such that analysis of this exceptional activity is of limited use in analytics visualizations for improving the general translation performance of TSC 10.

Figure 14:
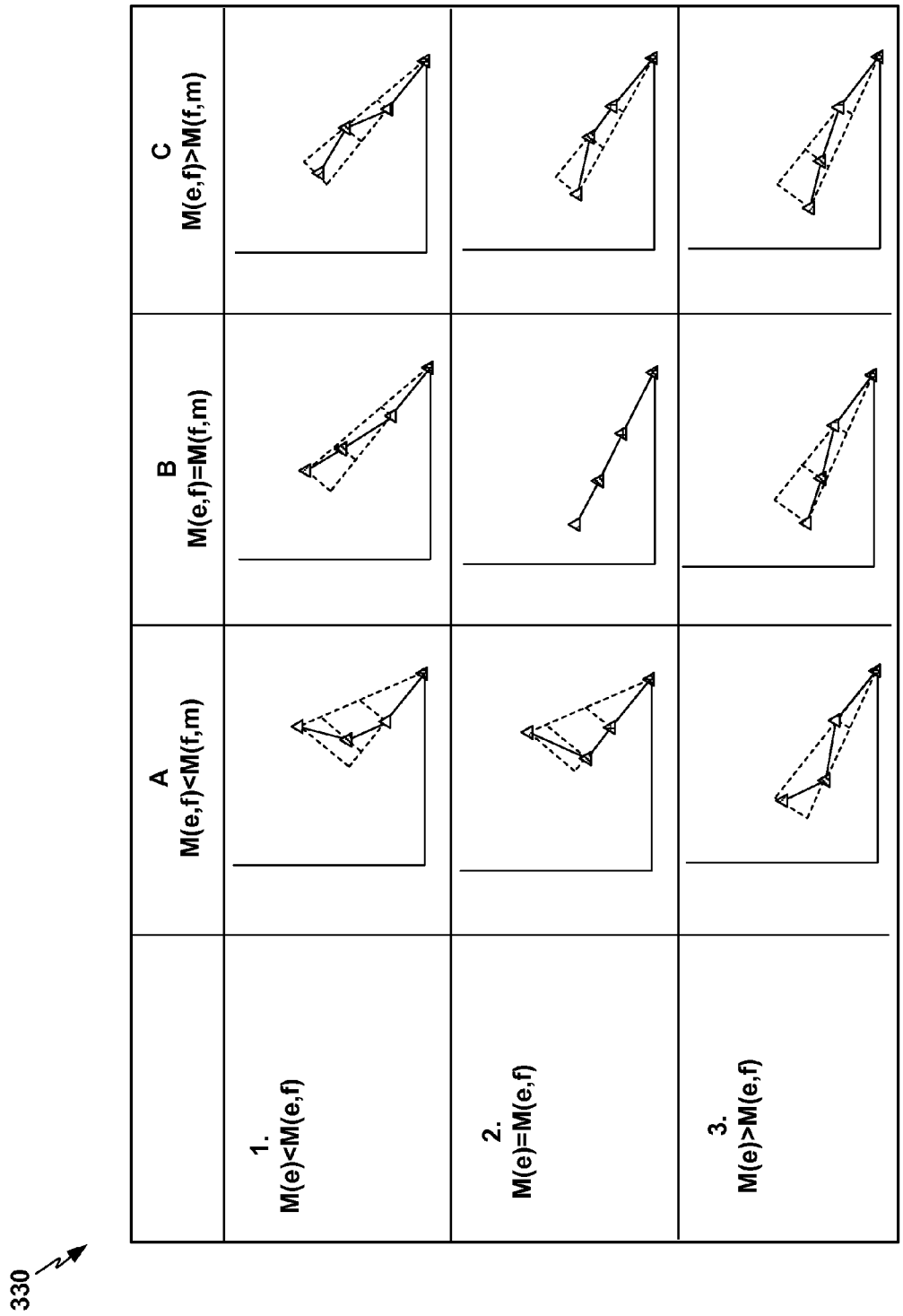
FIG. 14 depicts example linguistic marker analytics visualization graphs for an example classification framework of nine nominal or acceptable pattern classes into which the LNPR subsystem may classify various patterns of linguistic noise in performance of the TSC based on the relative slope of the contextual noise metric vector, the asset noise metric vector, and the machine noise metric vector defined by the EM, FM, and MT points on each of the linguistic marker graphs.

FIG. 14 depicts example linguistic marker analytics visualization graphs for an example classification framework of nine nominal or acceptable pattern classes into which LNPR subsystem 146 may classify various patterns of linguistic noise in performance of TSC 10 based on the relative slope of the contextual noise metric vector, the asset noise metric vector, and the machine noise metric vector defined by the EM, FM, and MT points on each of the linguistic marker graphs, as described above with reference to FIG. 13. As shown in FIG. 14, LNPR subsystem 146 may define these nine nominal pattern classes in accordance with a 3-by-3 classification framework based on noise metric vector criteria as described below. Each of these nine nominal pattern classes may generalize categories of performance characteristics of TSC 10 to provide a top-level overview of the relative strengths and weaknesses of the various components and sub-components of TSC 10. LNPR subsystem 146 may generate an analytics output identifying a set of results from TSC 10 as belonging to one of these nine nominal pattern classes, thereby providing actionable information for how and where to improve specific components of TSC 10. LNPR subsystem 146 may generate analytics outputs detailing the three linguistic noise metric variables described above, contextual linguistic noise, asset linguistic noise, and machine linguistic noise, as scalar percentages of the total linguistic noise of TSC 10 such that these three noise metric variables add up to 100%.

As shown in FIG. 14, the 3-by-3 classification framework is defined by three rows 1, 2, and 3 and three columns A, B, and C, defining nine classification patterns labeled 1A, 1B, 1C, 2A, 2B, 2C, 3A, 3B, 3C. Given a set of EM, FM and MT Linguistic Marker points averaged from the respective match types from a potentially large batch of linguistic events over one or more of a potentially large number of major keys of translation content, LNPR subsystem 146 may determine the contextual noise metric vector, the asset noise metric vector, and the machine noise metric vector with reference to the EM, FM, and MT points, and determine the slope of each of these three noise metric vectors. LNPR subsystem 146 may then compare the slope of the asset noise metric vector, M(e,f) (between the EM point and the FM point), to the slope of the contextual noise metric vector, M(e) (between the perfect match point (PMP) and the EM point), and the slope of the machine noise metric vector, M(f,m) (between the FM point and the MT point), to the slope of the asset noise metric vector, M(e,f). The three rows 1, 2, and 3 may be associated with the slope of the contextual noise metric vector M(e) being less than, equal to, or greater than the slope of the asset noise metric vector M(e,f), respectively, and the three columns A, B, and C may be associated with the slope of the asset noise metric vector M(e,f) being less than, equal to, or greater than the slope of the machine noise metric vector, M(f,m), respectively.

In each of the nine nominal pattern classes in the example classification framework of FIG. 14, LNPR subsystem 146 may determine the linguistic noise base, linguistic noise height, and linguistic noise area, as shown in the examples of each of the nine linguistic marker graphs in FIG. 14. As described above, LNPR subsystem 146 may define the linguistic noise height as equivalent to the magnitude of the EM central tendency vector of linguistic noise, such that the EM linguistic markers may provide the foundation for TSC analytics tool 22 to perform statistical modeling of the FM and MT linguistic markers as independent variables to be improved or optimized with reference to the EM linguistic markers. LNPR subsystem 146 may use the linguistic noise area and the nominal pattern classes as shown in FIG. 14 as primary measures to quantify the relationship between the EM, FM, and MT linguistic markers for purposes of analytics outputs. In some examples, LNPR subsystem 146 may group linguistic marker graphs for translation batches into groups of the classification patterns that may share certain top-level characteristics, such as a baseline threshold group, a triangle group, a dual triangle group, and a quad group. These classification groups are further described below.

Classification pattern B2 in the center of the 3-by-3 classification framework 330 is exceptional in that its linguistic noise area is zero, since the asset and machine noise metric vectors are in line with the context noise metric vector, or coinciding with the EM central tendency vector formed by extension from the context noise metric vector, giving a linguistic noise base of zero. Some translation batch linguistic noise graphs in the other classification patterns of classification framework 330 may also have very small deviations from alignment among all the noise metric vectors such that they are within a selected minimal threshold of similarity to classification pattern B2, or within a "base threshold" of zero linguistic noise base. An analytics output from LNPR subsystem 146 indicating linguistic noise base within the base threshold, may indicate that the techniques and training data applied by the fuzzy match production by TM component 2 and by MT component 3 are well-balanced and aligned with the exact match production by TM component 2

In some cases, LNPR subsystem 146 may generate other analytics visualizations to complement linguistic marker graphs. For example, LNPR subsystem 146 may generate linguistic noise Pareto charts 158 as introduced with reference to FIG. 7, which may provide additional analytics visualization of the frequency of linguistic distortion, including below the base threshold.

The triangle group may include classification patterns where two adjacent noise metric vectors are in line with each other, at least within a minimal distortion threshold (not necessarily precisely in line, as with base threshold). This occurs in the classification patterns A2, C2, B1, and B3 in FIG. 14. In classification patterns A2 and C2, the asset noise metric vector (i.e., the FM-EM vector) is in line with the context noise metric vector (i.e., the EM linguistic vector) to within the tolerance of the minimal distortion threshold, while in classification patterns B1 and B3, the machine noise metric vector (i.e., the MT-FM vector) is in line with the asset noise metric vector (i.e., the FM-EM vector) to within the tolerance of the minimal distortion threshold. These four classification patterns, and their FM and MT distortion vectors, are further characterized in Table 3 below.

TABLE 3

| | FM Distortion Vector | MT Distortion Vector |
|---|---|---|
| Class_Triangle_PositiveFM (C2) | Postive and absolute value is > | Positive |

TABLE 3-continued

|  | FM Distortion Vector | MT Distortion Vector |
| --- | --- | --- |
| Class_Triangle_PositiveMT (B3) | Positive and absolute value is <= DistortionThreshold | Positive |
| Class_Triangle_NegativeFM (A2) | Negative and absolute value is > DistortionThreshold | Negative |
| Class_Triangle_NegativeMT (B1) | Negative and absolute value is <= DistortionThreshold | Negative |

The dual triangle group may include classification patterns where the MT linguistic vector bisects the EM linguistic vector (i.e., the EM central tendency vector) and the FM linguistic vector, as in classification patterns A3 and C1 in FIG. 14. These two classification patterns are further characterized in Table 4 below.

TABLE 4

|  | MT Distortion Vector |
| --- | --- |
| Class_Dual_PositiveMT (A3) | Positive |
| Class_Dual_NegativeMT (C1) | Negative |

The quad group may include classification patterns where the FM and MT points are both to one side of the EM central tendency vector, as in classification patterns A1 and C3 in FIG. 14. These two classification patterns are further characterized in Table 5 below.

TABLE 5

|  | MT Distortion Vector |
| --- | --- |
| Class_Dual_PositiveMT (A1) | Positive |
| Class_Dual_NegativeMT (C3) | Negative |

On the other hand, in this example, translation batches that do not show one of the four special cases or nine nominal classification patterns described above, in the analytics outputs generated by LNPR subsystem 146, may be considered to have below nominal linguistic noise and below nominal overall performance by TSC 10, which LNPR subsystem 146 may flag or otherwise indicate in its analytics outputs. The linguistic marker graph output by LNPR subsystem 146 may also provide an indication of what component of TSC 10 is the primary source of this below-nominal linguistic noise and translation performance, such that the indicated component should be the primary target for improvement in order to improve the overall performance of TSC 10. For example, the linguistic marker analytics visualization graph 300 of FIG. 13 shows FM point 304 and MT point 306 on opposite sides of EM central tendency vector 318, a linguistic noise pattern that does not comply with any of the nominal classification patterns described above, and indicating that the MT matches generated by the MT component 4 in particular are exhibiting below nominal performance and generating extraneously high linguistic noise relative to the other components of TSC 10.

While LNPR subsystem 146 may generate the nominal classification patterns with their nominal and below nominal interpretations as described above in some examples, LNPR subsystem 146 or other component of TSC analytics tool 22 may also generate a wide variety of other analytics outputs with a variety of useful analytics characteristics for providing analytical and operational insights and actionable strategies for improvement in various examples. LNPR subsystem 146 may also partition translation segments by size or complexity, and generate analytics outputs based at least in part on analysis of translation segments partitioned by size or complexity.

In some examples, LNPR subsystem 146 may separately analyze the performance of the different components of TSC 10 on translation segments partitioned into three segment sizes: small, medium, and complex (SM, Med, CPLX0), for each shipment or other major key. These partitioned translation segments may be treated as linguistic pattern variables for linguistic noise pattern recognition (LNPR) techniques performed by LNPR subsystem 146. These pattern variables may allow analysis and drill down methods for downstream consumers of pattern recognition data and analytics outputs such as linguistic noise Pareto charts (further described below) generated by LNPR subsystem 146.

Figure 15:
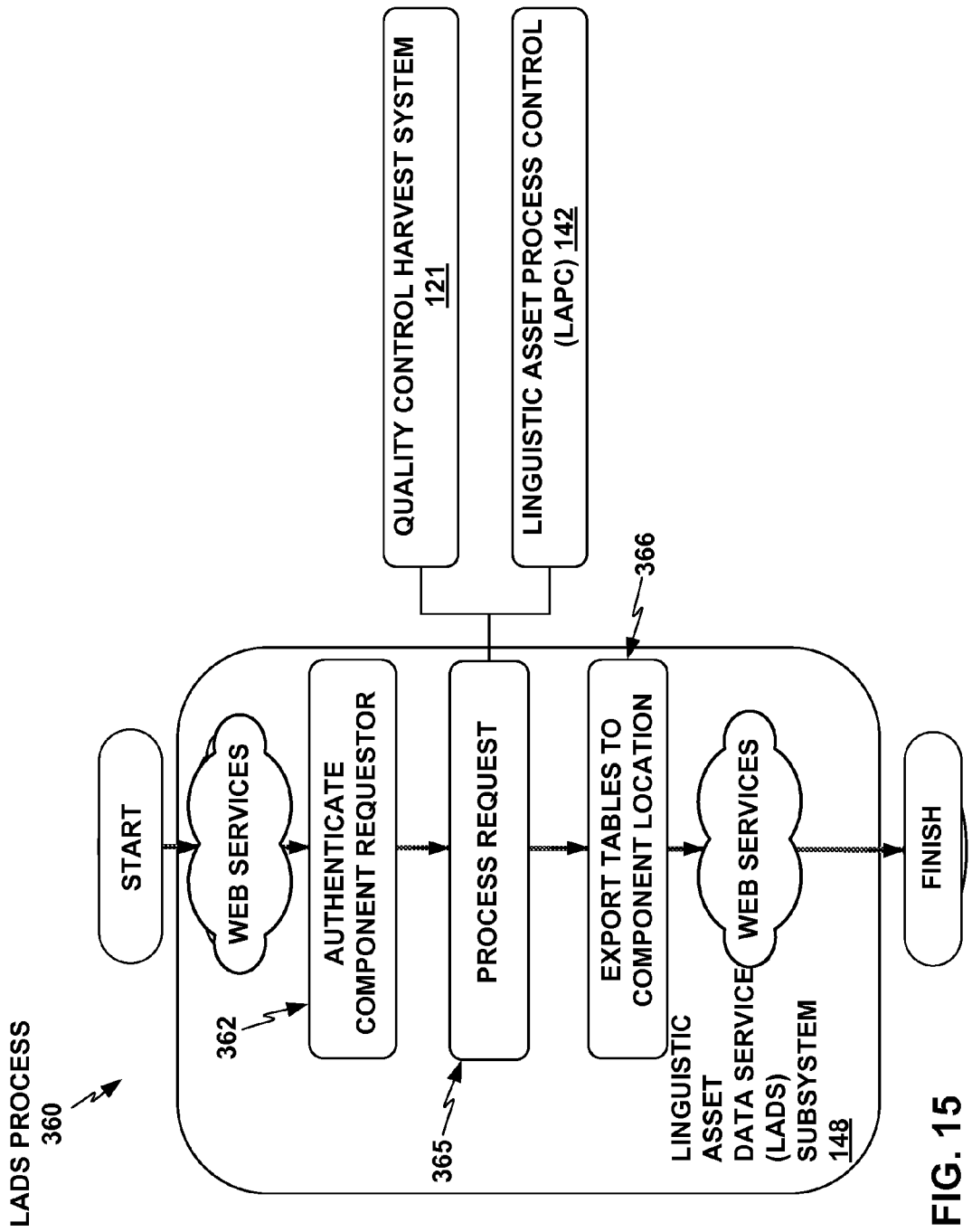
FIG. 15 depicts a conceptual component/process block diagram of an example process that the Linguistic Analytical Data Service (LADS) subsystem of the TSC analytics tool may perform.

FIG. 15 depicts a conceptual component/process block diagram of an example process 360 that Linguistic Analytical Data Service (LADS) subsystem 148 of TSC analytics tool 22 may perform. LADS subsystem 148 may provide access to operational variables, tables, charts, and other data objects within quality control DSAE 125 for use by downstream applications implementing improvement or optimization of the linguistics performance of TSC 10. LADS subsystem 148 may also request (365) various types of analysis reports from linguistic asset SPC subsystem 142 of TSC analytics tool 22. LADS subsystem 148 may provide access to the appropriate data for further analysis and component root cause analysis.

Specifically, LADS subsystem 148 may authenticate a request from a component requestor (362) and identify the set of operational variables desired for the request (365). LADS subsystem 148 may invoke one of the following methods. In some examples, LADS subsystem 148 may invoke a method to request 2×2 data tables that are already stored in the quality control DSAE per key identifier for a major key (e.g., shipment). LADS subsystem 148 may thus generate a list of operational variable identifiers to define the columns of tables to export to the component requestor in response to the component requestor. In some examples, LADS subsystem 148 may invoke a method to request an analysis report from the Linguistic Asset Statistical Process Control (SPC) subsystem 142 by specifying a Filter Spec, a Marker Spec, an Analysis Command, and a Linguistic Noise Chart Type (e.g., Pareto, four-quadrant, or Process Behavior). LADS subsystem 148 may return an analysis report as a data object (e.g., in JSON, PDF). LADS subsystem 148 may export the composed tables and/or data object to the component requestor (366). Either example of exporting tables to the component requestor may be, e.g., via a secure Web API.

Figure 16:
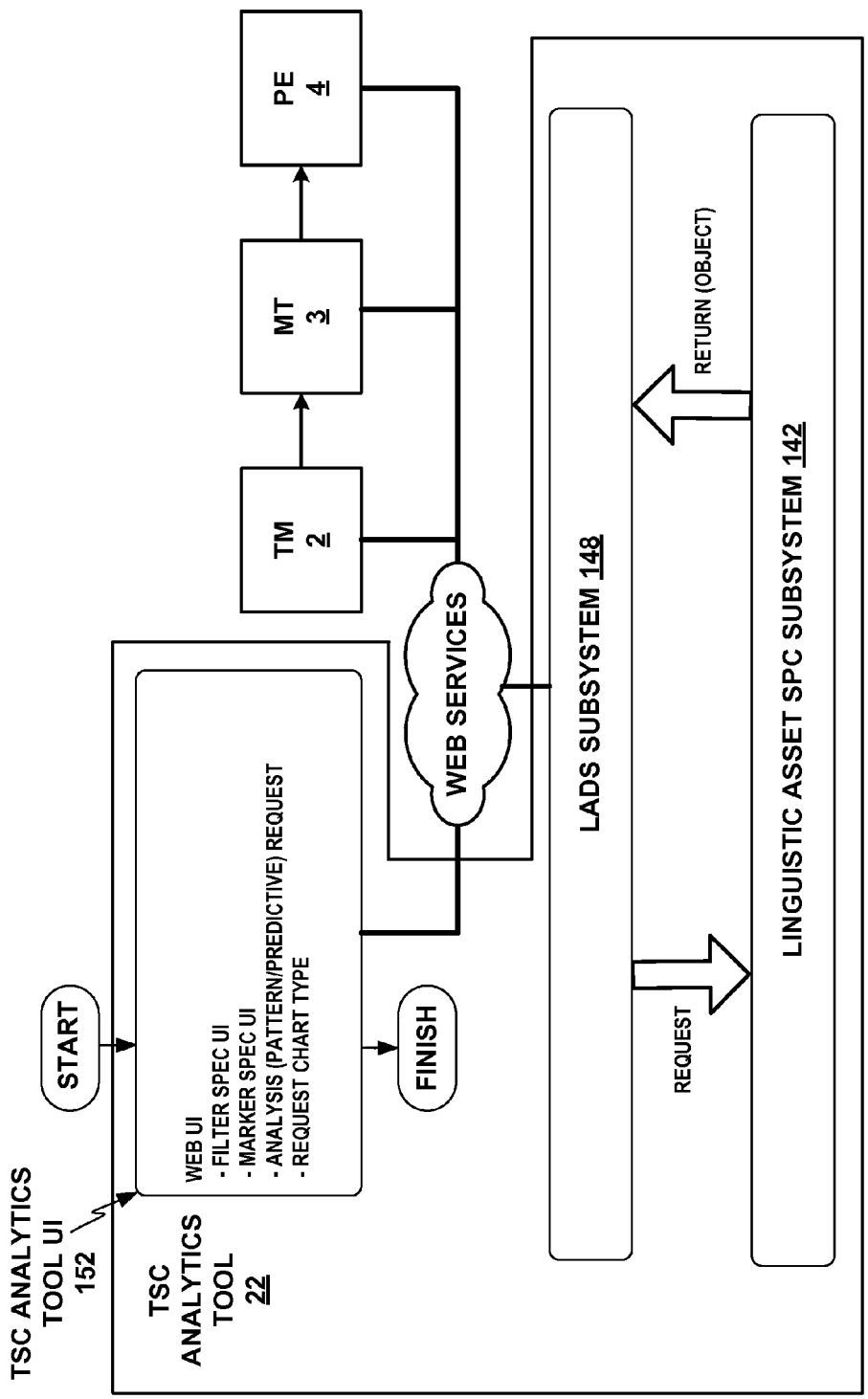
FIG. 16 depicts an example conceptual system block diagram of the TSC analytics tool interacting with the TM, MT, and PE components of the TSC and providing analytics outputs via a TSC analytics tool UI that provide actionable analysis for improving the functioning of the components of TSC.

FIG. 16 depicts an example conceptual system block diagram of TSC analytics tool 22 interacting with TM, MT, and PE components 2, 3, 4 of TSC 10 and providing analytics outputs via TSC analytics tool UI 152 that provide actionable analysis for improving the functioning of the components of TSC 10. Operational management users of TSC analytics tool 22 may use linguistic analytics outputs from TSC analytics tool 22 to do tuning, improving, and optimization of components within TSC 10, various examples of which applicable to TM, MT, and PE components 2, 3, 4 of TSC 10 are described below. As FIG. 16 shows, LADS subsystem 148 of TSC analytics tool 22 may collect data from TM, MT, and PE components 2, 3, 4 of TSC 10; perform analysis and generate analytics outputs, including by issuing requests to linguistic asset SPC subsystem 142 of TSC analytics tool 22 and receiving results from linguistic asset SPC subsystem 142; and communicate analytics outputs to TSC analytics tool UI 152 of TSC analytics tool 22. TSC analytics tool UI 152 may enable various user functions such as a filter specification UI; a linguistic marker specification UI; an analysis request UI, e.g., to define or request particular analytics outputs such as linguistic noise pattern recognition (LNPR) analyses or linguistic asset SPC predictive analyses; and a chart request UI to define or request particular analytics outputs such as linguistic noise Pareto charts. Examples of analytics outputs TSC analytics tool 22 may generate in the example of FIG. 16 are further described below.

TSC analytics tool UI 152 may include server-side and client-side applications and computing resources, all or part of which may be considered to be part of TSC analytics tool 22 in some examples; in other examples, TSC analytics tool 22 may be implemented or embodied only as a server-side or enterprise application or system of computing resources and may be configured to interact with a client application or client UI that may embody TSC analytics tool UI 152 or an analogous UI but be considered separate from TSC analytics tool 22.

TSC analytics tool 22 may generate analytics outputs for improving the performance of MT component 3 that can help correlate an MT metric value variable to the MT linguistic noise for a plurality of events. This MT metric value analysis can be used to evaluate internal tuning variables in MT component 4 that may benefit from being adjusted for future service requests. For example, TSC analytics tool 22 may analyze a translation batch partitioned according to three segment sizes as described above, and determine that an exceptional number of linguistic events for Medium segment size show a high MT linguistic noise based on training data from TM component 2 from a particular domain XYZ. TSC analytics tool 22 may thus generate an analytics output that includes an indication that MT component 4 may improve in performance if its training data is modified, e.g., to reject translations from domain XYZ, potentially also only on condition of the translation segments being of medium segment size or having an MT metric value below a selected threshold.

TSC analytics tool 22 may generate analytics outputs for improving the performance of TM component 2 as shown in FIG. 7. TM component 2 may analyze linguistic pattern classes generated by LNPR subsystem 146 and screen for below-nominal linguistic pattern classes associated with high linguistic noise, particularly due to fuzzy matches generated by TM component 2. TM component 2 may track Major Ontology Identifiers for various data used by TM component 2 and may correlated below-nominal linguistic pattern classes with major ontology identifiers to identify major ontology identifiers that may be sources of high linguistic noise in the fuzzy matches. TSC analytics tool 22 may then generate analytics outputs identifying major ontology identifiers used by TM component 2 that are particular sources of fuzzy match linguistic noise, and indicating how removing selected major ontology identifiers may reduce or eliminate sources of high linguistic noise in the performance of TM component 2.

Figure 17:
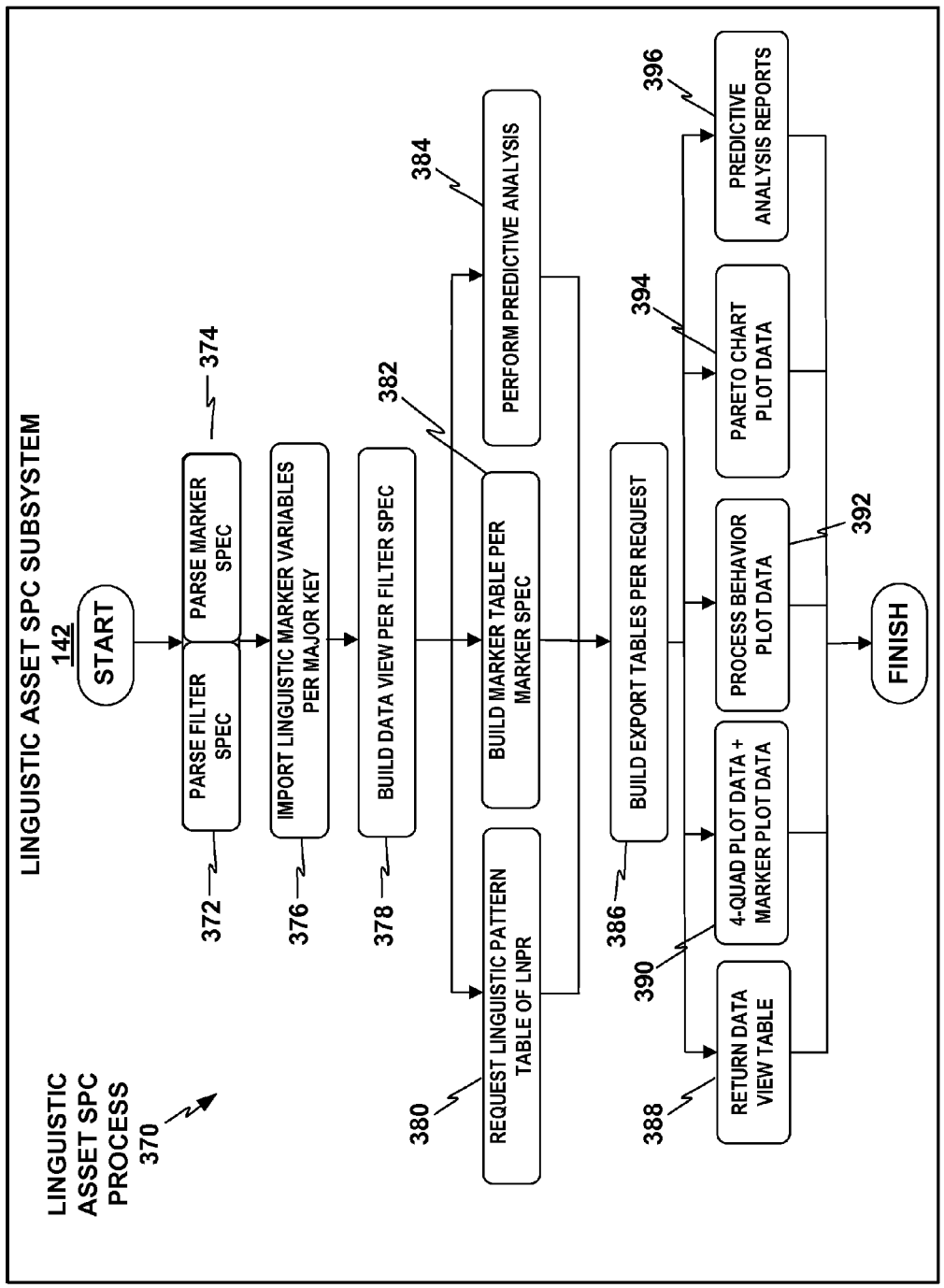
FIG. 17 depicts an example linguistic asset Statistical Process Control (SPC) process that the linguistic asset SPC subsystem may perform in response to receiving an analysis request from the LADS subsystem.

FIG. 17 depicts an example linguistic asset Statistical Process Control (SPC) process 380 that linguistic asset SPC subsystem 142 may perform in response to receiving an analysis request from LADS subsystem 148 as indicated above. Linguistic asset SPC subsystem 142 may perform data preparation, aggregation, filtering, and analysis in order to generate analytics visualization outputs that may reveal interdependencies across the various operational variables in TSC 10. Linguistic asset SPC subsystem 142 may respond to a request by performing the tasks described as follows.

Linguistic asset SPC subsystem 142 may parse a Filter Specification to determine how to filter or subset a full set of operational variables (372). An example Filter Specification is shown as follows (where ":=" means "composed of"):

```
FilterSpec := <varSpec1>:<varSpec2>: ... : <varSpecN>
varSpec := <varName> <operation> <value>
varName := a string identifying an operational variable
value := <string> | [<minStringPattern>,<maxStringPattern>]
operation := '=' | '< >'
string := any sequence of character
minStringPattern or maxStringPattern := any sequence of characters
```

Linguistic asset SPC subsystem 142 may filter the table of operational variables to create data view tables for downstream analytics visualization and/or processing. Linguistic asset SPC subsystem 142 may also parse a marker specification to determine how to aggregate the data view to compute the set of linguistic markers for each match type: EM, FM and MT (374). An example marker specification is shown as follows:

```
MarkerSpec := <varSpec1>:<varSpec2>: ... : <varSpecN>
varSpec := <varName> | <varName [displyOptions] > | <varName> = <mValue>
varName := a string identifying an operational variable
mValue := <string>      # Create marker if varName = mValue
string := any sequence of character
displayOption := color.size.shape_id
color = a color specification
size = size to show marker
shape_id := shape (triangle, circle,octagon,etc.) to show marker with.
```

Linguistic asset SPC subsystem 142 may select the database based on the major key requested and import the indicated linguistic marker operational variables per major key (376). Linguistic asset SPC subsystem 142 may then build a data view using the Filter Specification supplied (378). For example, this may include the ability to subset the view for a subset of TSC 10. An example subset is shown as follows:

```
quarter = [2013Q1,2013Q3]
ven=XXX
scope/segment size=medium
```

The request received by linguistic asset SPC subsystem 142 may include an analysis request, such as a pattern analysis command or a predictive analysis command. Linguistic asset SPC subsystem 142 may respond to a pattern analysis command by invoking LNPR subsystem to obtain requested pattern variables (380). The request received by linguistic asset SPC subsystem 142 may include a predictive analysis command. Linguistic asset SPC subsystem 142 may respond to a predictive analysis command by invoking statistical analytical streams to perform one or more predictive analysis models in accordance with the request (384). Linguistic asset SPC subsystem 142 may also build a marker table per the linguistic marker specification (382). The request may specify analytics outputs in accordance with one or more specific statistical models, or may specify a data view table or predictive analysis report, or may specify a default "base analysis" which may include analytics outputs based on three common statistical models, e.g., a four-quadrant scatter plot, a linguistic noise process behavior chart, and a linguistic noise Pareto chart.

Linguistic asset SPC subsystem 142 may respond to any of various request specifications by building export tables in accordance with the request specifications (386). Linguistic asset SPC subsystem 142 may then generate analytics outputs that may accordingly include one or more of a data view table (388), a four-quadrant scatter plot (390), a linguistic noise process behavior chart (392), a linguistic noise Pareto chart (394), and/or predictive analysis report (396). Linguistic asset SPC subsystem 142 may generate and communicate any one or more of these analytics outputs to TSC analytics tool UI 152, which may provide the one or more analytics outputs in a UI, such as in the form of graphical visualizations, tables, charts, spreadsheets, text reports, or other analytics output formats.

Figure 18:
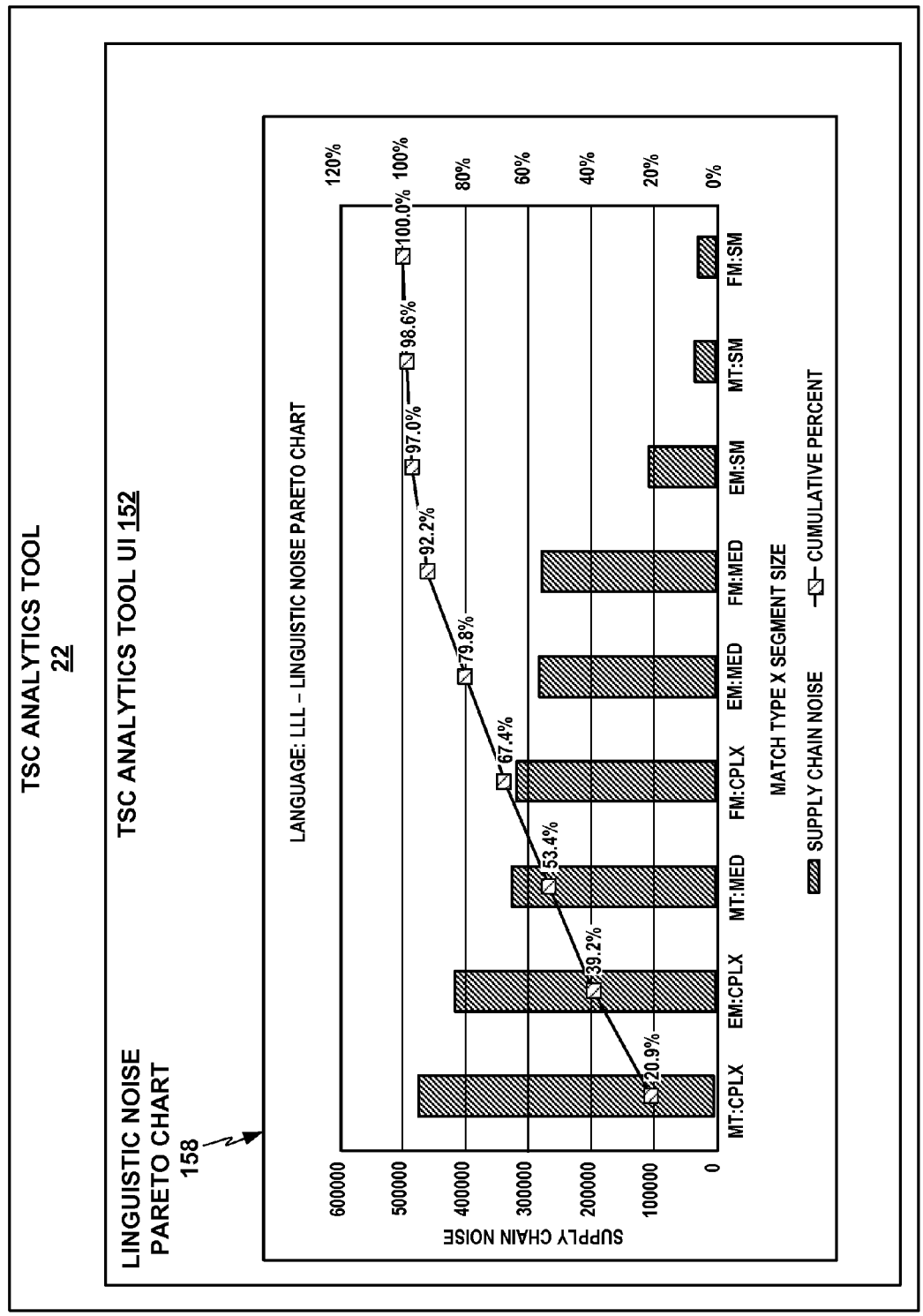
FIG. 18 depicts an example linguistic noise Pareto chart as an example analytics output that the linguistic asset SPC subsystem of TSC analytics tool may generate and provide via the TSC analytics tool UI.

FIG. 18 depicts an example linguistic noise Pareto chart 158 as an example analytics output that linguistic asset SPC subsystem 142 of TSC analytics tool may generate and provide via TSC analytics tool UI 152. Linguistic noise Pareto chart 158 displays the total linguistic noise of TSC 10 across a broad batch of translation content as determined by linguistic asset SPC subsystem 142 and as classified and partitioned by linguistic asset SPC subsystem 142 into both match type (MT, FM, or EM) and segment size (small, medium, or complex), and revealing substantial differences in linguistic noise generated between the different partitions. (Small, medium, and complex may be determined as segments of 1-4 words, 5-15 words, or greater than 15 words, respectively, for example.) Each column shows the total linguistic noise generated by that class or partition, and is paired with a corresponding curve graph plot point showing the cumulative percentage contribution of that class to the total linguistic noise. From left to right and from most linguistic noise generated to least, the classes are: MT complex, EM complex, MT medium, FM complex, EM medium, FM medium, EM small, MT small, and FM small.

Linguistic noise Pareto chart 158 therefore shows that segment size is a more important factor than match type in generating linguistic noise, with larger segment sizes causing more linguistic noise across match types. This may be particularly useful information because generally, PE component 4 actually performs more efficiently on smaller numbers of long segments than large numbers of small segments. More specifically, linguistic noise Pareto chart 158 reveals that complex machine translation segments are the single largest class source of linguistic noise, such that concentrating improvement efforts on MT component 3 and how it processes complex segments may yield the greatest potential improvement in the overall performance of TSC 10.

Linguistic noise Pareto chart 158 further reveals that the second most promising target for improving performance of TSC 10 is exact match processing of complex segments by TM component 2. This may be a surprising revelation about the performance of TSC 10 because exact match processing should normally generate the least linguistic noise, and the fact that exact match processing of complex segments is generating more noise than fuzzy match processing of complex segments may indicate a particularly anomalous source of poor performance in the exact match production by TM component 2, the resolution of which should be expected to result in a substantial gain in performance.

Linguistic noise Pareto chart 158 further reveals that the next largest sources of linguistic noise in TSC 10 are processing of medium segments by MT component 3, and fuzzy match processing of complex segments by TM component 2. This too may be a surprising revelation about the performance of TSC 10 because complex segments may normally be expected to result in substantially more linguistic noise than medium segments, and the disparity between these two classes reveals that MT component 3 is generating an outsized portion of linguistic noise relative to the fuzzy match production by TM component 2. This provides additional information in combination with the high amount of noise in MT complex processing that MT component 3 should be a primary focus of efforts to improve translation performance, in order to improve overall performance of TSC 10. Linguistic noise Pareto chart 158 and other analytics outputs from TSC analytics tool 22 may also enable drill-down analysis to facilitate more fine-grained investigation of particular elements of MT component 3 or other aspects of TSC 10 that show below-nominal performance, such that TSC analytics tool 22 may enable its users to trouble-shoot and isolate the root causes of poor performance in TSC 10.

Figure 19:
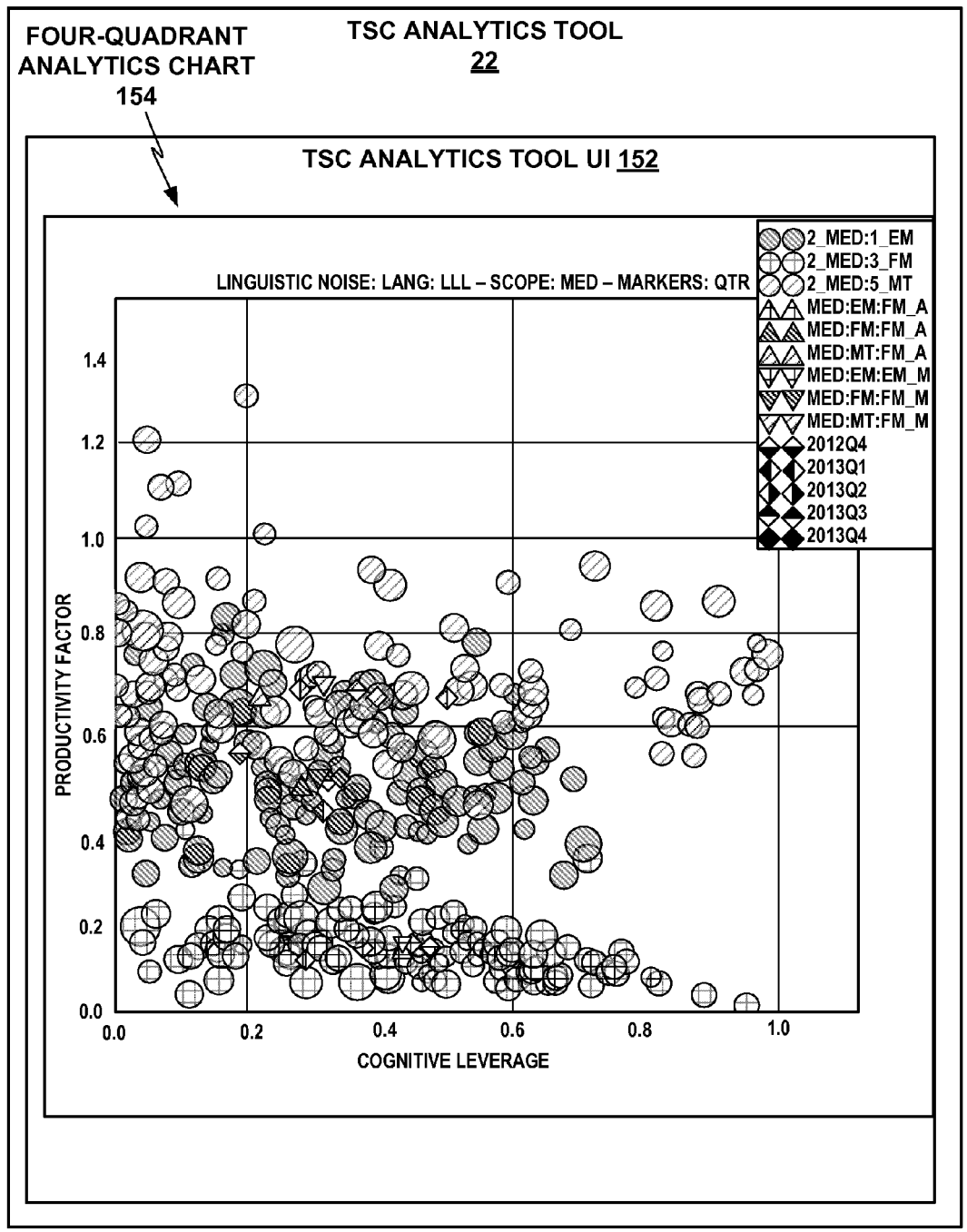
FIG. 19 depicts an example linguistic noise four-quadrant scatter plot as another example analytics output that the TSC analytics tool may generate.

FIG. 19 depicts an example linguistic noise four-quadrant scatter plot 154 as another example analytics output that TSC analytics tool 22 may generate. In particular, linguistic asset SPC subsystem 142 may generate four-quadrant scatter plot 154 in response to a request specifying a period of time of five quarters, specifying a segment size of medium, and specifying an entire language rather than one or more shipments as the selected major key; that is, all the medium segments of all the shipments of content translated into the indicated language over a period of fifteen months.

Four-quadrant scatter plot 154 includes one bubble per match type per shipment in the selected batch, such that each bubble represents the cognitive leverage L (along the x-axis) and the productivity factor F (along the y-axis) averaged over all the medium segments of one match type in one shipment of translation content. The bubbles may be color-coded as rendered as an analytics visualization output, e.g., with green for exact matches, blue for fuzzy matches, and red for machine translation matches. Four-quadrant scatter plot 154 may also include two groups of special markers for larger averages, e.g., upward triangles for mean averages per match type over all the shipments in the selected batch, downward triangles for medians per match type over all the shipments in the selected batch, and diamonds for mean averages per match type per quarter, for example. Any other type of averages or generalized functions in any other type of partition over any type of major key or period may also be selected and generated in any form for four-quadrant scatter plot analytics outputs in other examples.

Four-quadrant scatter plots generated by linguistic asset SPC subsystem 142 may therefore generate rich analytics visualizations that may facilitate deeper and more detailed understanding of the performance characteristics of TSC 10. TSC analytics tool 22 may also enable four-quadrant scatter plots with drill-down analytics features so that the four-quadrant scatter plot may provide a top-level overview of TSC performance that serves as a portal from which to explore a wealth of additional performance data. For example, a user may select samples of data on four-quadrant scatter plot 154 that are especially close to and especially far away from the perfect match point (lower-right corner) within a given match type, to compare and analyze potential root causes for extremes in performance, and to better understand how to emulate the exceptionally good performing data points and to remedy the ultimate causes of poor performance in the exceptionally below-nominal data points.

Figure 20:
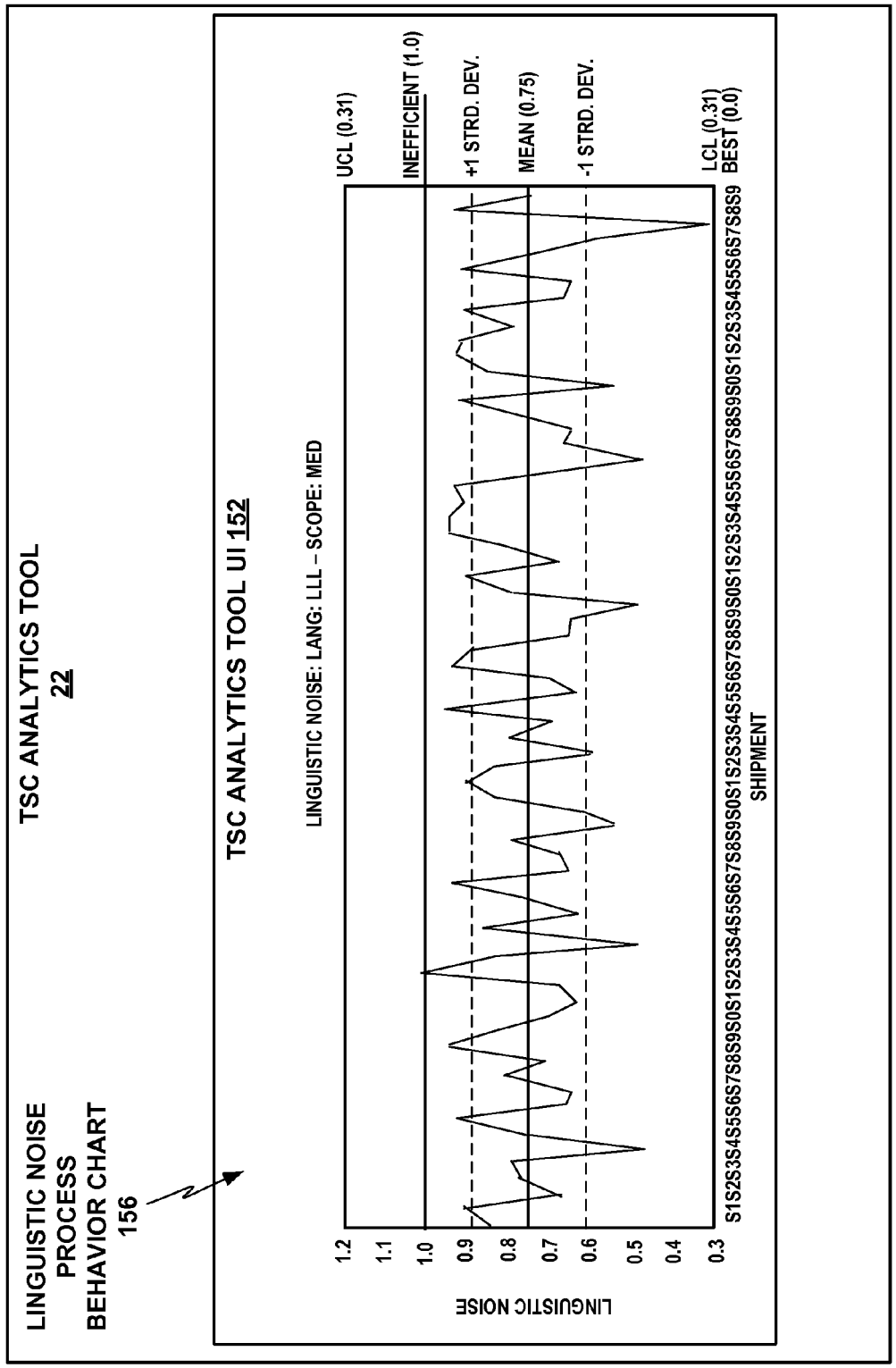
FIG. 20 depicts an example linguistic noise process behavior chart as another example analytics output that the TSC analytics tool may generate.

FIG. 20 depicts an example linguistic noise process behavior chart 156 as another example analytics output that TSC analytics tool 22 may generate, that may apply to the same data set described above with reference to FIG. 19. To generate linguistic noise process behavior chart 156, linguistic asset SPC subsystem 142 may determine an overall efficiency for each shipment (or other major key) of a selected collection of shipments, determine a mean average efficiency and a standard deviation, and then plot the efficiency of each of the shipments, with reference to the mean, standard deviation, and other reference levels, over a time-ordered sequence, time is represented along the x-axis and efficiency along the y-axis, with higher efficiency represented by a lower position.

Linguistic noise process behavior chart 156 thus provides a single analytics visualization of relative total efficiency of TSC 10 for each of a potentially large number of shipments or other major keys of translation content. Linguistic noise process behavior chart 156 also enables instant identification of the shipments that achieved the highest and lowest efficiency and other outlier shipments that were either above or below the standard deviation or other reference level. Linguistic noise process behavior chart 156 further enables visualization at a glance of whether the overall efficiency of TSC 10 has been steadily improving or degrading, or shows any other persistent secular trend over time.

To determine an overall efficiency for each shipment, linguistic asset SPC subsystem 142 may determine each match point linguistic vector for each shipment, and then apply a weighting to each match point linguistic vector by the percentage of words for generating linguistic noise for each match type. Linguistic asset SPC subsystem 142 may then sum the EM, FM and MT linguistic noise elements per shipment as the overall linguistic noise for the shipment.

Linguistic noise process behavior chart 156 in the example of FIG. 20 shows that the selected data set, applying only to medium size segments, are performing within a mean of 0.75 (i.e., affecting 75% of the words translated), and that none of the shipments exceeded one standard deviation of low efficiency. Linguistic noise process behavior chart 156 also shows at a glance which shipments had the lowest efficiency. TSC analytics tool 22 may provide drill-down analytics features directly from Linguistic noise process behavior chart 156 enabling a user to acquire and analyze further details of those shipments that stand out on Linguistic noise process behavior chart 156 as having the lowest efficiency, to seek out the root causes and how they might be resolved in the future.

Figure 21:
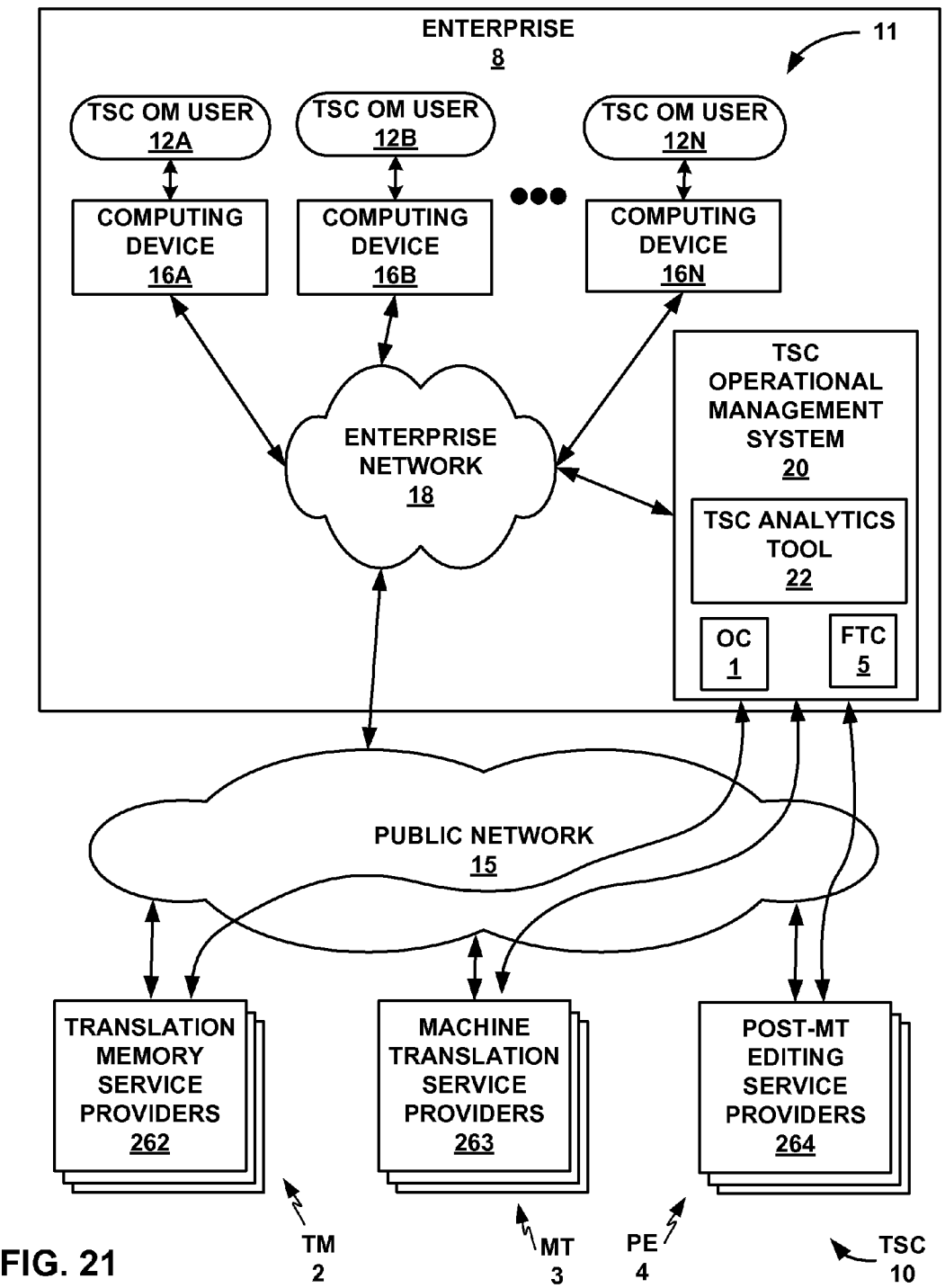
FIG. 21 is a conceptual block diagram illustrating an example context in which a TSC operational management system and TSC analytics tool may be used.

FIG. 21 is a conceptual block diagram illustrating an example context in which a TSC operational management system 20 and TSC analytics tool 22 may be used. FIG. 21 depicts an example enterprise 8 having a computing environment 11 in which a plurality of TSC chain operational management users 12A-12N (collectively, "users 12") may interact with TSC chain operational management system 20 and TSC analytics tool 22, as described further above. In the system shown in FIG. 21, TSC chain operational management system 20 is communicatively coupled to a number of client computing devices 16A-16N (collectively, "client computing devices 16" or "computing devices 16") by an enterprise network 18. Users 12 interact with their respective computing devices to access TSC chain operational management system 20 and TSC analytics tool 22. Users 12, computing devices 16A-16N, enterprise network 18, and TSC chain operational management system 20 may all be either in a single facility or widely dispersed in two or more separate locations anywhere in the world, in different examples.

Enterprise 8 is connected via enterprise network 18 to public network 15, such as the Internet. TSC chain operational management system 20 takes in shipments of original content 1 to be translated, and manages the processing of the shipments through TSC 10, which may include external TM service providers 262 who fulfill some or all of the functions of TM component 2, external MT service providers 263 who fulfill some or all of the functions of MT component 3, and external PE service providers 264 who fulfill some or all of the functions of PE component 4, and all of whom may communicate with enterprise 8 and TSC chain operational management system 20 via public network 15. Enterprise 8 may also include internal units or systems that provide some or all of the functions of one or more of TM component 2, MT component 3, and/or PE component 4.

In this example, TSC chain operational management system 20 may include servers that run TSC chain operational management web applications for users 12 operating client computing devices 16 to interact with TSC chain operational management system 20 and TSC analytics tool 22. A user 12 may use a TSC chain operational management portal on a client computing device 16 to view and manipulate information such as control applications for TSC chain operational management system 20 and TSC analytics tool 22, TSC analytics tool UI 152, and other collections and visualizations of data via their respective computing devices 16.

Users 12 may use a variety of different types of computing devices 16 to interact with TSC chain operational management system 20 and access data visualization tools and other resources via enterprise network 18. For example, a user 12 may interact with TSC chain operational management system 20 and run a TSC chain operational management portal that may include TSC analytics tool UI 152 using a laptop computer, a desktop computer, or the like, which may run a web browser. Alternatively, a user 12 may use a smartphone, tablet computer, or similar device, running a TSC chain operational management dashboard that may include TSC analytics tool UI 152 in a web browser, a dedicated mobile application, or other means for interacting with enterprise TSC chain operational management system 20.

Enterprise network 18 and public network 15 may represent any communication network, and may include a packet-based digital network such as a private enterprise intranet or a public network like the Internet. In this manner, computing environment 9 can readily scale to suit large enterprises and a large number of components, entities, or vendors within TSC 10. Users 12 may directly access TSC chain operational management system 20 via a local area network, or may remotely access TSC chain operational management system 20 via a virtual private network, remote dial-up, or similar remote access communication mechanism.

Figure 22:
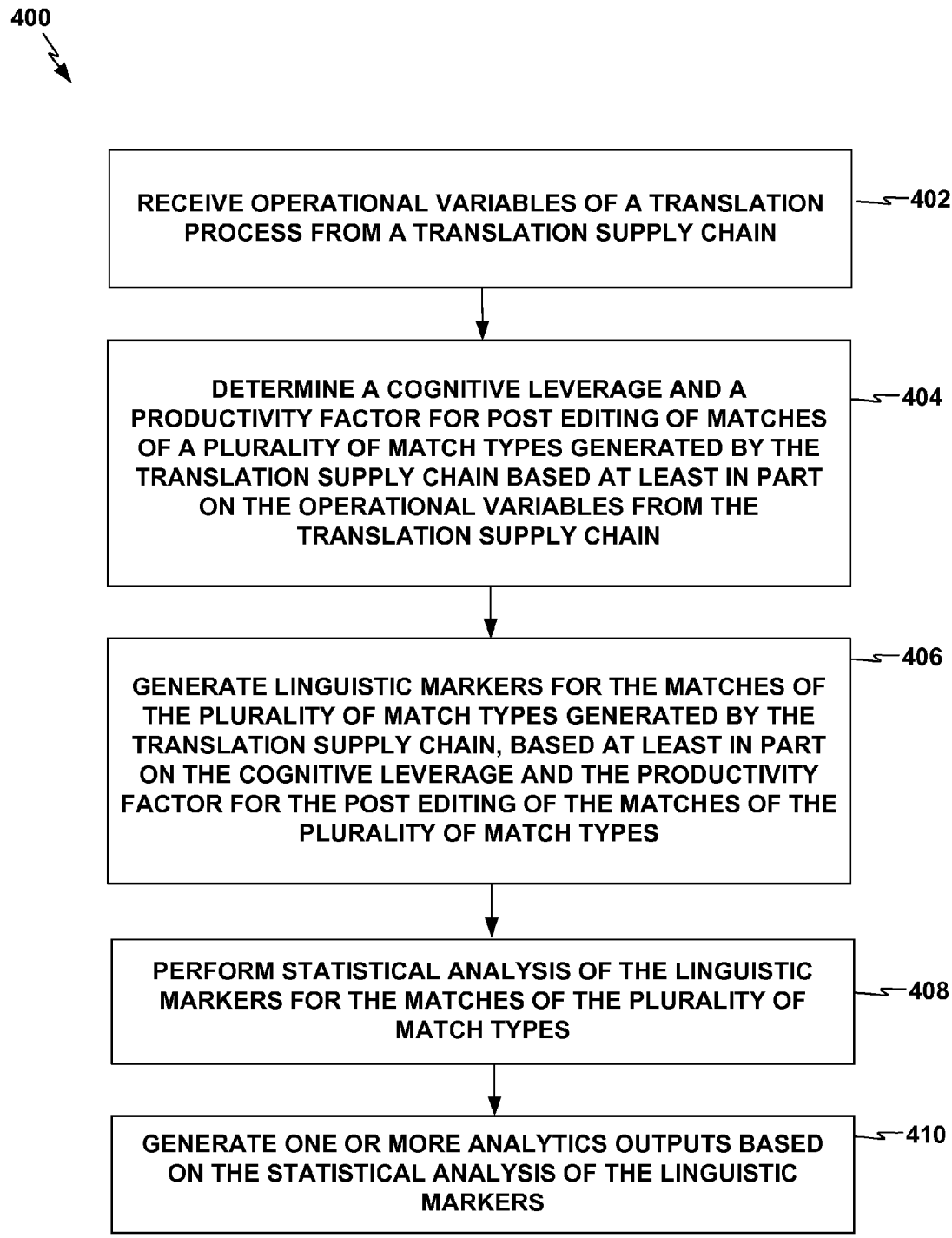
FIG. 22 shows a flowchart for an example overall process that the TSC analytics tool, executing on one or more computing devices (e.g., servers, computers, processors, etc.), may perform for generating translation supply chain analytics.

FIG. 22 shows a flowchart for an example overall process 400 that TSC analytics tool 22, executing on one or more computing devices (e.g., servers, computers, processors, etc.), may perform for generating translation supply chain analytics. TSC analytics tool 22 may receive operational variables of a translation process from a translation supply chain (402). TSC analytics tool 22 may determine a cognitive leverage and a productivity factor for post editing of matches of a plurality of match types generated by the translation supply chain based at least in part on the operational variables from the translation supply chain (404). TSC analytics tool 22 may generate linguistic markers for the matches of the plurality of match types generated by the translation supply chain, based at least in part on the cognitive leverage and the productivity factor for the post editing of the matches of the plurality of match types (406). TSC analytics tool 22 may perform statistical analysis of the linguistic markers for the matches of the plurality of match types (408). TSC analytics tool 22 may generate one or more analytics outputs based on the statistical analysis of the linguistic markers (410).

Figure 23:
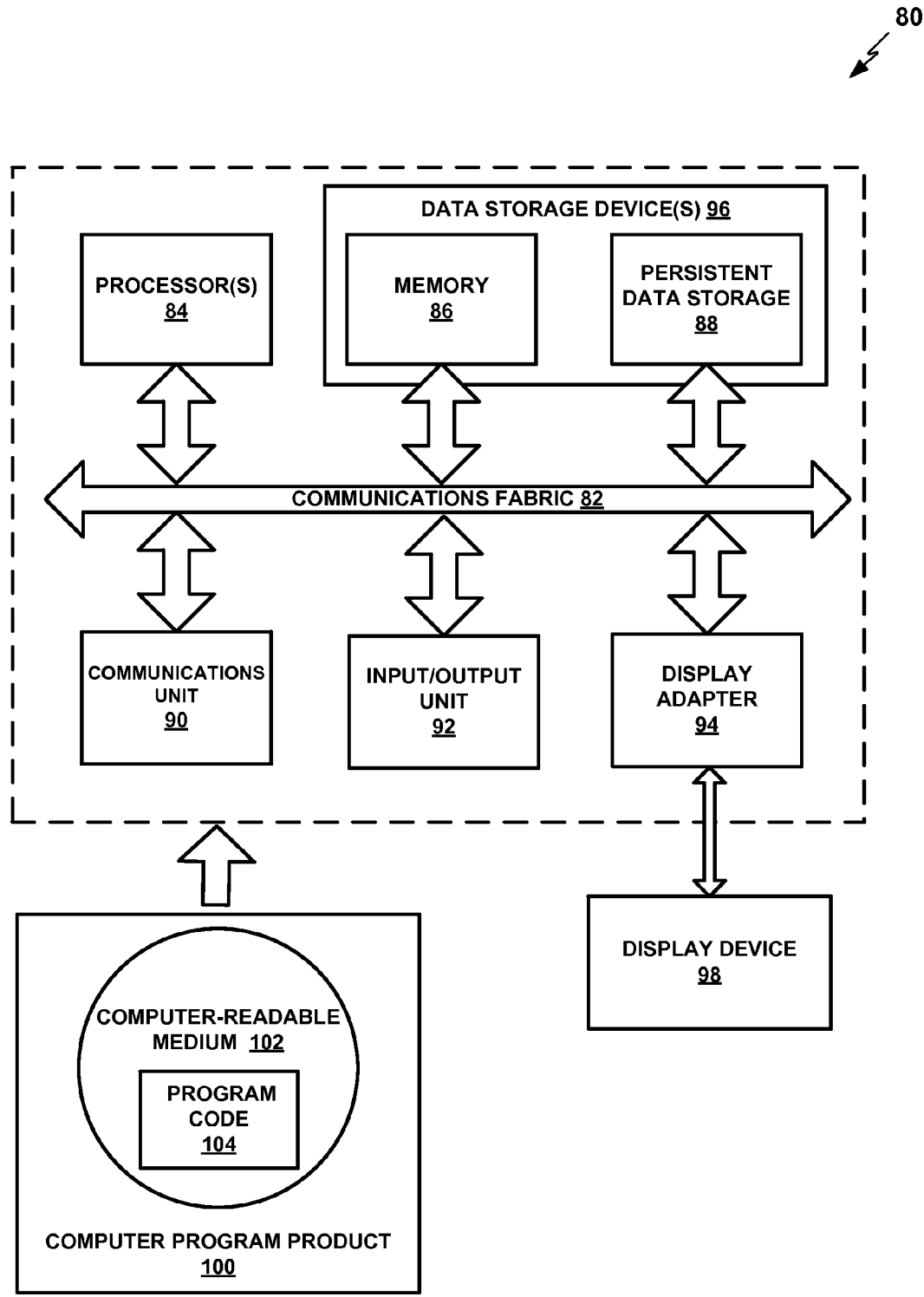
FIG. 23 is a block diagram of a computing device that may be used to execute or implement a TSC analytics tool, according to an illustrative example.

FIG. 23 is a block diagram of a computing device 80 that may be used to execute a TSC analytics tool 22, according to an illustrative example. Computing device 80 may be a server such as described above with reference to FIG. 21. Computing device 80 may also be any server for providing a TSC analytics tool application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind Other implementations of a computing device 80 may include a computer having capabilities or formats other than or beyond those described herein.

In the illustrative example of FIG. 8, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a TSC analytics tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
receiving operational variables of a translation process from a translation supply chain;
determining a cognitive leverage and a productivity factor for post editing of matches of a plurality of match types generated by the translation supply chain based at least in part on the operational variables from the translation supply chain, wherein the plurality of match types comprise exact matches, fuzzy matches, and machine translation matches;
generating linguistic markers for the matches of the plurality of match types generated by the translation supply chain, based at least in part on the cognitive leverage and the productivity factor for the post editing of the matches of the plurality of match types;
performing statistical analysis of the linguistic markers for the matches of the plurality of match types; and
generating one or more analytics outputs based on the statistical analysis of the linguistic markers, wherein generating the one or more analytics outputs comprises:
determining mean averages for the exact matches, the fuzzy matches, and the machine translation matches in terms of the cognitive leverage and the productivity factor for a unit of translation content; and
generating a linguistic marker graph that graphically depicts an exact match linguistic marker point (EM point) representing a mean average for a plurality of exact matches, a fuzzy match linguistic marker point (FM point) representing a mean average for a plurality of fuzzy matches, and a machine translation match linguistic marker point (MT point) representing a mean average for a plurality of machine translation matches.

2. The method of claim 1, wherein the plurality of match types comprise exact matches, fuzzy matches, and machine translation matches, wherein the exact matches and fuzzy matches are generated by a translation memory component of the translation supply chain, wherein the machine translation matches are generated by a machine translation component of the translation supply chain, and wherein the post editing is performed by a post editing component of the translation supply chain.

3. The method of claim 1, wherein the cognitive leverage is based at least in part on a percentage of acceptances of the matches of the plurality of match types in the post editing, and wherein the productivity factor is based at least in part on a weighted measurement of time per word to translate source segments with one or more match.

4. The method of claim 1, further comprising:
generating linguistic vectors across a coordinate space; and
generating a determination of linguistic noise based at least in part on the linguistic vectors,
wherein performing the statistical analysis of the linguistic markers comprises performing statistical analysis of the linguistic vectors and the determination of linguistic noise, and
wherein generating the analytics outputs comprises generating a visualization graph of the linguistic vectors across the coordinate space and indicating the determination of linguistic noise.

5. A method comprising:
receiving operational variables of a translation process from a translation supply chain;
determining a cognitive leverage and a productivity factor for post editing of matches of a plurality of match types generated by the translation supply chain based at least in part on the operational variables from the translation supply chain, wherein the match types include machine translation matches;
generating linguistic markers for the matches of the plurality of match types generated by the translation supply chain, based at least in part on the cognitive leverage and the productivity factor for the post editing of the matches of the plurality of match types;
performing statistical analysis of the linguistic markers for the matches of the plurality of match types;
generating one or more analytics outputs based on the statistical analysis of the linguistic markers; and
generating predictive machine translation models based on a predictive analysis of the operational variables to reduce linguistic noise in the machine translation matches, wherein generating the predictive machine translation models comprises:
a quality control harvest system enabling components of the translation supply chain to attach component markers to the matches as the matches are passed through the translation supply chain;
providing the component markers to a predictive machine translation analysis subsystem;
defining a set of core linguistic metric variables, a set of translation memory component markers, and a set of machine translation component markers based on the component markers for a quality control data store and analysis engine to make available to the predictive machine translation analysis subsystem for predictive machine translation analytics and modeling;
analyzing and correlating the component markers with the linguistic markers to build statistical predictive models across the component markers; and
a linguistic asset data service providing analytical data feeds upstream to the components of the translation supply chain to improve performance of the components of the translation supply chain.

6. A method comprising:
receiving operational variables of a translation process from a translation supply chain;
determining a cognitive leverage and a productivity factor for post editing of matches of a plurality of match types generated by the translation supply chain based at least in part on the operational variables from the translation supply chain;
generating linguistic markers for the matches of the plurality of match types generated by the translation supply chain, based at least in part on the cognitive leverage and the productivity factor for the post editing of the matches of the plurality of match types;
performing statistical analysis of the linguistic markers for the matches of the plurality of match types;
generating one or more analytics outputs based on the statistical analysis of the linguistic markers;
performing pattern recognition analysis of the linguistic markers; and
generating one or more analytics outputs based on the pattern recognition analysis of the linguistic markers,
wherein performing the pattern recognition analysis of the linguistic markers comprises:
generating linguistic pattern class variables used in a linguistic noise pattern recognition process for visualization of faults and patterns across the translation supply chain; and
performing classification of linguistic noise patterns comprising not nominal linguistic pattern classes and nominal linguistic pattern classes via linguistic noise pattern recognition,
wherein generating the one or more analytics outputs based on the pattern recognition analysis of the linguistic markers comprises generating a visualization of the classification of the linguistic noise patterns for a plurality of translation segments.

7. The method of claim 6, further comprising:
using the linguistic markers to generate exact match noise threshold variables as control limits in the linguistic noise pattern recognition and the visualization of faults and patterns across the translation supply chain;
generating a plurality of linguistic marker graphs for each of a collection of units of translation content, comprising an exact match point, a fuzzy match point, and a machine translation point based on averages of the linguistic marker graphs;
determining an upper threshold of vector length from the exact match point to the fuzzy match point and the machine translation point as a statistical function over the linguistic marker graphs;
classifying an exact match minimum threshold and an exact match maximum threshold;
classifying vectors between the fuzzy match linguistic marker and the exact match linguistic marker, and between the machine translation match linguistic marker and the exact match linguistic marker to assess two or more of exceptional, optimal, nominal, sub-nominal and extreme sub-nominal patterns; and
generating a visualization in response to the exact match maximum threshold being exceeded, showing that a vector length is exceeded for a linguistic marker graph in which the vector length from the exact match point to the fuzzy match point or the machine translation point exceeds the exact match maximum threshold.

8. The method of claim 6, further comprising:
generating cumulative noise metric values based at least in part on the linguistic markers, the cumulative noise metric values comprising a context noise value based at least in part on the exact match point, an asset noise value based at least in part on the fuzzy match point and the exact match point, and a machine noise value based at least in part on the machine translation match point and the fuzzy match point, wherein the context noise value, the asset noise value, and the machine noise value add up to 100% of linguistic noise across the translation supply chain; and
generating an analytics visualization output graphically depicting the cumulative noise metric values.

9. The method of claim 1, further comprising:
providing a Filter Specification Language configured to classify variables to be used in analysis and visualization;
providing a Markup Specification Language to classify a set of visual markers to determine and to include in the analytics outputs; and
providing a linguistic asset data service configured for requesting and communicating component analytical data from components of the translation supply chain as specified using the Filter Specification Language and the Markup Specification Language.

10. The method of claim 1, wherein generating the one or more analytics outputs comprises generating a linguistic noise Pareto chart that graphically depicts one or more of: relative total linguistic noise across the translation supply chain for one or more selected groups of translation matches, and cumulative contribution to total linguistic noise across the translation supply chain for the one or more selected groups of translation matches.

11. The method of claim 1, wherein generating the one or more analytics outputs comprises generating a four-quadrant scatter plot that graphically depicts one or more selected groups of translation matches according to values of the cognitive leverage and the productivity factor for the selected groups of translation matches for each of a plurality of units of translation content, and mean averages for selected collections of the selected groups of translation matches.

12. The method of claim 1, wherein generating the one or more analytics outputs comprises:
determining an overall translation efficiency for each of a plurality of units of translation content;
determining a mean average and a standard deviation of the overall translation efficiency of the units of translation content; and
generating a linguistic noise process behavior chart that graphically depicts the overall translation efficiency for the units of translation content in reference to the mean average and the standard deviation of the overall translation efficiency of the units of translation content.

13. The method of claim 1, wherein the analytics outputs enable drill-down analytics features on the statistical analysis of the linguistic markers.

14. A non-transitory computer program product for translation supply chain analytics, the computer program product comprising a computer-readable storage medium having program code embodied therewith, the program code executable by a computing device to:
receive operational variables of a translation process from a translation supply chain;
determine a cognitive leverage and a productivity factor for post editing of matches of a plurality of match types generated by the translation supply chain based at least in part on the operational variables from the translation supply chain, wherein the plurality of match types comprise exact matches, fuzzy matches, and machine translation matches;
generate linguistic markers for the matches of the plurality of match types generated by the translation supply chain, based at least in part on the cognitive leverage and the productivity factor for the post editing of the matches of the plurality of match types;
perform statistical analysis of the linguistic markers for the matches of the plurality of match types; and
generate one or more analytics outputs based on the statistical analysis of the linguistic markers, wherein generating the one or more analytics outputs comprises:
determining mean averages for the exact matches, the fuzzy matches, and the machine translation matches in terms of the cognitive leverage and the productivity factor for a unit of translation content; and
generating a linguistic marker graph that graphically depicts an exact match linguistic marker point (EM point) representing a mean average for a plurality of exact matches, a fuzzy match linguistic marker point (FM point) representing a mean average for a plurality of fuzzy matches, and a machine translation match linguistic marker point (MT point) representing a mean average for a plurality of machine translation matches.

15. The computer program product of claim 14, wherein the plurality of match types comprise exact matches, fuzzy matches, and machine translation matches, wherein the exact matches and fuzzy matches are generated by a translation memory component of the translation supply chain, the machine translation matches are generated by a machine translation component of the translation supply chain, and the post editing is performed by a post editing component of the translation supply chain.

16. The computer program product of claim 14, wherein the cognitive leverage is based at least in part on a percentage of acceptances of the matches of the plurality of match types in the post editing, and wherein the productivity factor is based at least in part words per minute of new translated content to replace rejected matches weighted by words per minute of the acceptances of the matches in the post editing.

17. A computer system for translation supply chain analytics, the computer system comprising:
one or more processors, one or more computer-readable memories, and one or more computer-readable, tangible storage devices;
program instructions, stored on at least one of the one or more storage devices for execution by at least one of the one or more processors via at least one of the one or more memories, to receive operational variables of a translation process from a translation supply chain;
program instructions, stored on at least one of the one or more storage devices for execution by at least one of the one or more processors via at least one of the one or more memories, to determine a cognitive leverage and a productivity factor for post editing of matches of a plurality of match types generated by the translation supply chain based at least in part on the operational variables from the translation supply chain, wherein the plurality of match types comprise exact matches, fuzzy matches, and machine translation matches;

program instructions, stored on at least one of the one or more storage devices for execution by at least one of the one or more processors via at least one of the one or more memories, to generate linguistic markers for the matches of the plurality of match types generated by the translation supply chain, based at least in part on the cognitive leverage and the productivity factor for the post editing of the matches of the plurality of match types;

program instructions, stored on at least one of the one or more storage devices for execution by at least one of the one or more processors via at least one of the one or more memories, to perform statistical analysis of the linguistic markers for the matches of the plurality of match types; and program instructions, stored on at least one of the one or more storage devices for execution by at least one of the one or more processors via at least one of the one or more memories, to generate one or more analytics outputs based on the statistical analysis of the linguistic markers, wherein generating the one or more analytics outputs comprises:

determining mean averages for the exact matches, the fuzzy matches, and the machine translation matches in terms of the cognitive leverage and the productivity factor for a unit of translation content; and generating a linguistic marker graph that graphically depicts an exact match linguistic marker point (EM point) representing a mean average for a plurality of exact matches, a fuzzy match linguistic marker point (FM point) representing a mean average for a plurality of fuzzy matches, and a machine translation match linguistic marker point (MT point) representing a mean average for a plurality of machine translation matches.

18. The computer system of claim 17, wherein the plurality of match types comprise exact matches, fuzzy matches, and machine translation matches, wherein the exact matches and fuzzy matches are generated by a translation memory component of the translation supply chain, the machine translation matches are generated by a machine translation component of the translation supply chain, and the post editing is performed by a post editing component of the translation supply chain.

19. The computer system of claim 17, wherein the cognitive leverage is based at least in part on a percentage of acceptances of the matches of the plurality of match types in the post editing, and wherein the productivity factor is based at least in part words per minute of new translated content to replace rejected matches weighted by words per minute of the acceptances of the matches in the post editing.

* * * * *